(12) United States Patent
Gatlin et al.

(10) Patent No.: US 9,018,145 B2
(45) Date of Patent: Apr. 28, 2015

(54) FOAMER COMPOSITION AND METHODS FOR MAKING AND USING SAME

(75) Inventors: Larry W. Gatlin, San Antonio, TX (US); Garth Shewchuk, Calgary (CA); Colby P. Rodriguez, San Antonio, TX (US)

(73) Assignee: Lubrizol Oilfield Solutions, Inc., The Woodlands, TX (US)

( * ) Notice: Subject to any disclaimer, the term of this patent is extended or adjusted under 35 U.S.C. 154(b) by 183 days.

(21) Appl. No.: 10/745,290

(22) Filed: Dec. 23, 2003

(65) Prior Publication Data
US 2005/0137114 A1 Jun. 23, 2005

(51) Int. Cl.
C09K 8/38 (2006.01)
C11D 1/12 (2006.01)
C09K 8/70 (2006.01)

(52) U.S. Cl.
CPC .. *C09K 8/703* (2013.01); *C09K 8/38* (2013.01)

(58) Field of Classification Search
USPC ......... 510/188, 245, 258, 271, 274, 424, 426, 510/490, 499, 503, 504, 505
See application file for complete search history.

(56) References Cited

U.S. PATENT DOCUMENTS

| | | | |
|---|---|---|---|
| 3,980,769 A | 9/1976 | Ghilardi et al. | A61K 7/06 |
| 4,201,678 A | 5/1980 | Pye et al. | |
| 4,713,182 A | 12/1987 | Hiltz et al. | A62D 1/00 |
| 4,796,702 A * | 1/1989 | Scherubel | 166/308.6 |
| 5,074,358 A | 12/1991 | Rendall et al. | |
| 5,203,411 A | 4/1993 | Dawe et al. | |
| 5,591,701 A | 1/1997 | Thomas | C09K 7/02 |
| 5,676,876 A | 10/1997 | Winkler, III et al. | A62D 1/00 |
| 6,864,314 B1 * | 3/2005 | Yeung et al. | 525/91 |
| 2004/0052746 A1* | 3/2004 | Tamareselvy et al. | 424/70.11 |
| 2004/0069342 A1 | 4/2004 | Hellsten et al. | F17D 1/16 |
| 2005/0130847 A1 | 6/2005 | Gatlin et al. | E21B 43/00 |
| 2005/0153846 A1 | 7/2005 | Gatlin | C11D 17/00 |
| 2005/0250666 A1 | 11/2005 | Gatlin et al. | C10G 29/20 |
| 2006/0116296 A1 | 6/2006 | Kippie et al. | C11D 17/00 |
| 2006/0194700 A1 | 8/2006 | Gatlin et al. | C09K 8/04 |

FOREIGN PATENT DOCUMENTS

| | | | | |
|---|---|---|---|---|
| CA | 2137636 A1 | 6/1995 | | |
| EP | 0781838 A1 | 7/1997 | | C11D 3/37 |
| WO | WO9417154 A1 | 8/1994 | | |
| WO | WO 98/51767 A1 | 11/1998 | | C11D 1/83 |
| WO | WO 00/71240 A1 | 11/2000 | | B01F 17/00 |
| WO | WO0071591 A1 | 11/2000 | | |

(Continued)

OTHER PUBLICATIONS

2005, EPO Search Report.
U.S. Appl. No. 11/328,432, filed Jan. 9, 2006, Wilson.

(Continued)

*Primary Examiner* — Necholus Ogden, Jr.
(74) *Attorney, Agent, or Firm* — Robert W Strozier

(57) ABSTRACT

A new general purpose foaming agent having application as drilling fluid foaming agents or as any foaming agent needed an a wide variety of applications is disclosed, where the agent includes at least one anionic surfactant, at least one cationic surfactant, and mixtures thereof and one or more zwitterionic compounds. A method for using the foaming agent in capillary coiled tubing application is also disclosed. The foaming agents can also include additive to augment the properties of the foaming agent for a given application.

35 Claims, 1 Drawing Sheet

(56) References Cited

FOREIGN PATENT DOCUMENTS

| | | | | |
|---|---|---|---|---|
| WO | WO 03/043526 A1 | 5/2003 | ............... | A61D 1/02 |
| WO | WO 03/080786 A1 | 10/2003 | ............... | C11D 3/00 |

OTHER PUBLICATIONS

U.S. Appl. No. 11/293,859, filed Dec. 2, 2005, Kippie et al.
U.S. Appl. No. 11/298,547, filed Dec. 9, 2005, Gatlin et al.
U.S. Appl. No. 11/298,556, filed Dec. 9, 2005, Gatlin et al.
U.S. Appl. No. 11/339,303, filed Jan. 25, 2006, Lukos et al.
U.S. Appl. No. 11/545,387, filed Oct. 10, 2006, Gatlin et al.
U.S. Appl. No. 11/554,834, filed Oct. 31, 2006, Venditto et al.
Search Report—Norway.
Translation of Office Action—Norway.

* cited by examiner

FOAMER COMPOSITION AND METHODS FOR MAKING AND USING SAME

BACKGROUND OF THE INVENTION

1. Field of the Invention

The present invention relates to a novel former composition for use in downhole operations.

More particularly, the present invention relates a novel former composition for use in downhole operations including a mixture of surfactants and zwitterionic compounds, where the composition is environmentally friendly, biodegradable, produces no residue when used in capillary coiled tubing applications, and is resistant to high temperatures.

2. Description of the Related Art

In oil and gas drilling operations, it has been the almost universal practice up until recent years to circulate a liquid, such as water, oil, a water-in-oil emulsion, or an oil-in-water emulsion, usually with mud solids, clay particles, suspended therein, to and from the drilling zone during the drilling operation. One of the functions in circulating these drilling fluids, usually in the form of a drilling mud, is to remove drilled solids from the bit and lift cuttings from the bore. As can be readily understood the drilling liquid must be circulated under high pressure to assure entrainment of cuttings and expulsion of mud from the bore hole.

In recent years, some wells have been successfully drilled at a reduced pressure by a different technique in which a compressed gas, such as air, is pumped into the well at the drilling site. This compressed gas flows rapidly up the well bore annulus around the drill collar carrying with it the drilled solids and thus removing them from the drill hole. While in some instances, the drilling operation is essentially a dry process in many formations, water high in electrolyte concentration, enters the bore hole from adjacent water-containing strata. Such water invasion most often occurs while drilling in or through a water bearing subterranean zone, but may also be encountered in any area in the vicinity of trapped underground water.

Some of the advantages of the gas drilling method over the more conventional mud drilling method include increased penetration rate, longer bit life, accurate location of water-bearing zones and measurement of flow, precise location of oil and gas bearing zones, especially those of low formation pressure, flow and pressure testing of productive zones without resort to drill stem tests, a lessening of possible contamination of prospective or known producing zones, and greater flexibility in physical-chemical alteration of the drilling fluid to meet particular down hole conditions. However, one difficulty in mist or dry gas drilling where water seeps into the bore and accumulates in the drilling zone is that the drilled solids tend to agglomerate as the drill string rotates. These agglomerated masses become too heavy to be lifted out by the gas so that antiballing agents, and foaming agents must be introduced into the bore to prevent this condition.

In recent years, the technology of air and mud drilling has been combined in an attempt to provide drilling foams which have greater lifting strength than air but which do not have the pressure limitations of drilling muds.

The rheological properties of aqueous foams are of great importance for a number of applications in petroleum production. These properties include high flow rates in tubes or pipes and in porous media such as oil-bearing sandstones. Aqueous foam has advantages in oil fields that contain viscous oil in low pressure reservoirs. In these operations, the foam raises to the surface not only sand pulverized by the bit but also pebbles and rocks of considerable size.

The requirements for utilization of an aqueous foam in subterranean formations include high stability with waters containing appreciable quantities of soluble salts, such as sodium chloride, calcium salts and/or magnesium salts, and the capability for handling a variety of foam breaking elements such as crude oil and solids. Further the foam must not degrade under extremes of physical environments.

Numerous foam compositions have been proposed and used, however most have proven unsatisfactory in one respect or another. Among the various classes of foaming compositions are nonionics; however, these are affected by salts and high temperatures encountered in drilling. Although many anionic surfactants provide acceptable foams in soft waters, they form foam breaking precipitates in the presence of brine and/or hard water. Cationics are ineffective foamers because of their intolerance to high salinity.

Thus there is a need in the art for a superior foaming agent especially agents for use in capillary coiled tubing (CCT) applications, foam applications, recyclable foam drilling applications, well clean out applications or similar application, especially useful in application were low permeability is required, where the foaming agent is environmentally friendly, biodegradable, produces no residual, and is resistant to high temperatures.

SUMMARY OF THE INVENTION

The present invention provides an aqueous foaming composition including at least one anionic surfactant, cationic surfactant or a mixture or combination thereof and at least one zwitterionic compounds where the composition is environmentally friendly, biodegradable, produces no residual, and is resistant to high temperatures.

The present invention provides an aqueous foaming composition including at least two anionic surfactants, cationic surfactants or a mixture or combination thereof and at least one zwitterionic compounds where the composition is environmentally friendly, biodegradable, produces no residual, and is resistant to high temperatures.

The present invention provides an aqueous foaming composition including at least two anionic surfactants, and at least one zwitterionic compounds where the composition is environmentally friendly, biodegradable, produces no residual, and is resistant to high temperatures.

The present invention provides an aqueous foaming composition including at least two cationic surfactants and at least one zwitterionic compounds where the composition is environmentally friendly, biodegradable, produces no residual, and is resistant to high temperatures.

The present invention provides an aqueous foaming composition including a mixture or combination of at least one anionic surfactants and at least one cationic surfactants and at least one zwitterionic compounds where the composition is environmentally friendly, biodegradable, produces no residual, and is resistant to high temperatures.

The present invention also provides a foaming composition including at least two anionic ammonium alcohol ether sulfate surfactants and at least one zwitterionic compound, preferably a betaine, sulfo-betaine, amino acids, a zwitterionic phospholipid, or mixture or combinations thereof.

The present invention also provides a foaming composition including at least two cationic bis quaternary ammonium halide surfactants and at least one zwitterionic compound, preferably a betaine, sulfo-betaine, a zwitterionic phospholipid, or mixture or combinations thereof.

The present invention also provides formulation including about 15 to about 35 wt. % of a betaine containing solution, about 8 to about 16 wt. % of a first ammonium alcohol ether sulfate surfactant solution, and about 40 to about 60 wt. % of a second ammonium alcohol ether sulfate surfactant solution, with the balance being water and/or water and a freezing point depressant such as a glycol, an alcohol, a salt, mixtures thereof, or the like.

The present invention also provides formulation including about 20 to about 30 wt. % of a betaine containing solution, about 10 to about 14 wt. % of a first ammonium alcohol ether sulfate surfactant solution and about 45 to about 55 wt. % of a second ammonium alcohol ether sulfate surfactant solution, with the balance being water.

The present invention also provides formulation including about 25 wt. % of a betaine containing solution, about 12 wt. % of a first ammonium alcohol ether sulfate surfactant solution and about 50 wt. % of a second ammonium alcohol ether sulfate surfactant solution with the balance being water.

The present invention also provides formulation including from about 40 wt. % to about 80 wt. % of a zwitterionic-containing foam composition including about 25 wt. % of a betaine containing solution, about 12 wt. % of a first ammonium alcohol ether sulfate surfactant solution and about 50 wt. % of a second ammonium alcohol ether sulfate surfactant solution, with the balance being water, from about 60 to about 20 wt. % of an AOS and from about 1 wt. % to about 15 wt. % methanol. A preferred formulation includes from about 45 wt. % to about 70 wt. % of the zwitterionic-containing foam composition, from about 55 wt. % to about 30 wt. % of the AOS, and from about 5 wt. % to about 10 wt. % methanol. A more preferred formulation includes from about 50 wt. % to about 60 wt. % of the zwitterionic-containing foam composition, from about 50 wt. % to about 40 wt. % of the AOS, and from about 5 wt. % to about 10 wt. % methanol. A particular preferred formulation includes about 55 wt. % of the zwitterionic-containing foam composition, about 45 wt. % of the AOS, and about 10 wt. % methanol.

The present invention also provides a foaming composition of this invention diluted with a purified water including, without limitation, deionized water, osmotically purified water or water purified by any other technique known in the art.

The present invention also provided a foaming composition of this invention diluted with a winterizing agent selected from the group consisting of glycols, formates, or any other freezing point depressant.

The present invention provides a method for foaming a fluid including the steps of adding to the fluid an foaming effective amount of a foaming composition of this invention in a single, multiple or continuation additions protocol depending on the requirements.

The present invention provides a method for supply a foaming composition to a downhole fluid including the steps of inserting at least one capillary coiled tubing into a well borehole to a desired depth below a fluid depth in the borehole and feeding an effective amount of a foaming composition of this invention in single, multiple and/or continuation additions depending on the requirements, where the amount is sufficient to achieve desired foamed fluid characteristics.

The present invention also provides a method including the steps of injecting into a downhole fluid an aqueous solution via capillary coiled tubing including a first effective amount of a foaming composition of this invention to form a foam, adding a defoaming agent to the foam as the foam exits the well to break the foam, separating production fluids from the solution phase, adding supplemental effective amounts of the foaming composition to reform a foam, and repeating the last three steps.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
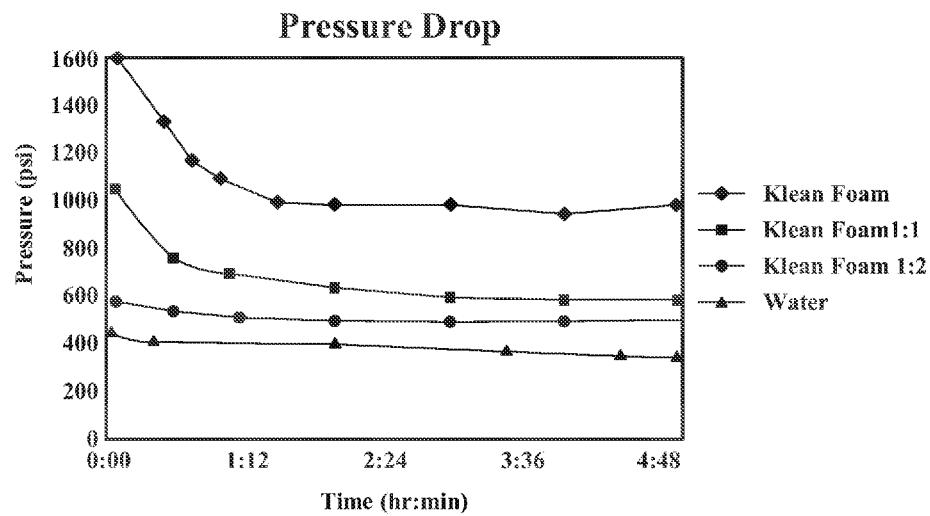
FIG. 1 depicts a plot of pressure drop v. time for neat foaming agent, a 1:1 water dilution and a 2:1 water dilution.

The inventors have found that a novel general purpose foaming composition can be prepared by combining anionic surfactants with zwitterionic compounds to form a foaming composition that is environmentally friendly, is biodegradable, has low to no residuals, has a near zero Zeta value, and has high temperature stability or is resistant to high temperatures. The properties of the foaming compositions can be modified for speciality application through the addition of additives such as low temperature additive such as winterizing and/or anti-freeze agents, foam boosters, solvents such as isopropyl alcohol (IPA), the sodium salts of short chain alpha olefin sulfonates, nonionic surfactants, fatty acids (lauric acid, oleic acid, stearic acid, etc.) or other additives to augment the basic characteristics of the foaming composition for a given application. The foaming compositions of this invention are ideally suited for drilling operations, especially underbalanced drilling operations, recyclable drilling operations, coiled tubing drilling and clean out operations, capillary coiled tubing (CCT) applications (foaming CCT production), foam applications, recyclable foam drilling applications, well intervention service applications, well clean out applications, formation clean outs (fracturing or pumping foam into the formation to open formation for oil and/or gas production), or similar applications. In unbalanced drilling operations, the foaming agent of this invention allows for the well fluid's hydrostatic head pressure to be reduced below that of the formation pressure by forming a foam that is then broken at the top of the well so that the well fluids and produced hydrocarbons can be separated and the well fluids refoamed, for continued operations.

The present invention broadly relates to a foaming composition including at least one anionic surfactant and at least one zwitterionic agent. One preferred class of foaming compositions of this invention include two anionic surfactants and a zwitterionic agent, where the anionic surfactants are selected from the group consisting of ammonium alkyl alcohol ether sulfate surfactants, alkylated phenol ether sulfate surfactants or mixtures or combinations thereof and the zwitterionic agent is selected from the group consisting of alkylated amino acids (naturally occurring or synthetic) where the nitrogen atom bears four substituents and bears a formal positive charge such as betaines, other alkylated di and poly amino acids where one or all of the nitrogen atom bear four substituents and bear formal positive charges, or mixtures or combinations thereof. The present invention is also useful as a polymer free foaming agent for use when drilling through shales, where the foaming compositions of this invention shows superior foam integrity without the need for polymer additives.

The present invention broadly relates to a method for foaming fluids including the step of adding an effective amount of a foaming composition of this invention to a fluid to result is a foamed fluid. The foamed fluid can be used in drilling, recyclable drilling, well intervention operations and well clean out operations, coiled tubing drilling, recyclable drilling and well clean out operations, capillary coiled tubing (CCT) operations, CCT clean out operations, recycle foaming and foaming operations or other similar types of operations. The method can also include the step of breaking the foam with the addition of an effective amount of a defoamer to recover the fluid. The method can also include repeating the adding or foam making step and foam breaking step continuously or over a set period of time. The repeated application of the foaming and defoaming steps is called a recycle method.

Suitable Reagents

Suitable anionic surfactants include, without limitation, anionic sulfate surfactant, alkyl ether sulfonates, alkylaryl sulfonates, or mixture or combinations. Preferred sodium or ammonium alcohol ether sulfate surfactants include those having the general formula $R^1O$—$(CH_2CH_2O)_nSO_3NH_4$, where $R^1$ is a carbon-containing group including an alkyl group, an aryl group, an alkaryl group, an aralkyl group or mixture thereof. Particularly preferred sodium or ammonium alcohol ether sulfate surfactants include short chain sodium or ammonium alcohol ether sulfate surfactants having between 2 and about 10 carbon atoms, especially, between about 4 and 10 carbon atoms and long chain sodium or ammonium alcohol ether sulfate surfactants having between about 10 to about 24 carbon atoms, more particularly, between about 12 and about 18 carbon atoms, especially, between about 12 and about 14 carbon atoms. The sodium ammonium alcohol ether sulfate surfactants are prepared by reacting 1 to 10 moles of ethylene oxide per mole of alkanol, preferred, are prepared by reacting 3 moles of ethylene oxide per mole of alkanol.

Preferred alkylaryl sulfonates including, without limitation, alkyl benzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, or mixture or combinations thereof.

preferred alkyl ether sulfonates including, without limitation, alkyl ether sulfonates having the general formula $R^2[-(O-R^3O)m-(R^4O)n-(R^5)]_y$, where: $R^2$ = alkyl, alkenyl, amine, alkylamine, dialkylamine, trialkylamine, aromatic, polyaromatic, cycloalkane, cycloalkene, $R^3$, $R^4$ =$C_2H_4$ or $C_3H_6$ or $C_4H_8$, $R^4$ = linear or branched $C_7H_{14}SO_3X$ to $C_{30}H_{60}SO_3X$ when y =1, $R^5$ = linear or branched $C_7H_{14}SO_3X$ to $C_{30}H_{60}SO_3X$ or H when y >1 but at least one $R^4$ must be linear or branched $C_7H_{14}SO_3X$ to $C_{30}H_{60}SO_3X$, M is greater or equal to 1, n is greater or equal to 0, n + m =1 to 30+, y is greater or equal to 1, X =alkali metal or alkaline earth metal or ammonium or amine.

Suitable cationic surfactants include, without limitation, Gemini, bis or di quaternary ammonium surfactants such as bis quaternary ammonium halides of bis halogenated ethane, propane, butane or higher halogenated alkanes, e.g., dichloroethane or dibromoethane, or bis halogenated ethers such as dichloroethylether(DCEE). Preferred bis quaternary ammonium halides are prepared from substituted dimethyl tertiary amines, where the substituent includes between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety. Particularly preferred bis quaternary ammonium halides hydrocarbons are prepared from naturally occurring acids, such as fatty acids, synthetic acids, modified naturally occurring acids, or mixture or combinations thereof. Preferred naturally occurring acids are those found in naturally occurring oils such as coconut oil, palm oil, palm kernel oil, soya, safflower oil, sunflower oil, peanut oil, canola oil, or from animal such as tallow oil and its derivatives. Preferred bis quaternary ammonium halides are prepared from disubstituted methyltertiaryamines, where the substituents include between about 4 and about 30 carbon atoms, preferably, between about 6 and about 24 carbon atoms, and particularly, between about 8 and about 24 carbon atoms, and where one or more of the carbon atoms can be replace by an oxygen atom in the form of an ether and/or hydroxyl moiety and/or a nitrogen atom is the form of an amido moiety, such as amidopropyltertiary amines, derived from the reaction of dimethyl aminopropylamine(DMAPA) or similar terminated primary-tertiary diamines, reacted with the above mentioned oils or their corresponding fatty acids, or hydroxy acids. Other preferred cationic surfactants are dimer acids or anhydrides including alkylsubstituted maleic anhydride, alkylsubstituted diethylmalonic acid, or alkylsubstituted higher diacids such as azelaic acid (C9), trimer acids as NTA (nitriloacetic acid), and aconitic acid and trimetellic anhydride are useful though producting a higher trimer the tertiary amine may be accomplished by reaction of a diamine with a fatty acid or oil, reacting with one amine and then converting the other primary amine to tertiary by the addition of tetrahydrofuran, ethylene oxide,propylene oxide, butylene oxide, epichlorohydrin, or the like and further where the terminal hydrogens of the primary amine can be alkylated using formaldehyde/formic acid mixtures.

Suitable zwitterionic compounds include, without limitation: (1) any compound having the general structure $R^6, R^7, R^8N^+$—$R^9$—$CO_2^-$, where $R^6$, $R^7$, and $R^8$ are the same or different carbon-containing group, amido carbon-containing group, ether carbon-containing group, or mixtures thereof, and $R^9$ is an alkenyl group, alkenyloxide group or mixtures thereof, (2) any compound having the general structure $R^{10}(R^7,R^8N^+$—$R^9$—$CO_2^-)_n$, where $R^7$ and $R^8$ are the same or different carbon-containing group, amido carbon-containing group, ether carbon-containing group, or mixtures thereof, $R^9$ is an alkenyl group, alkenyloxide group or mixtures thereof, and $R^{10}$ is a multivalent substituent having a valency n between 2 and about 6, e.g., $CH_2$ moiety when n is 2, a CH moiety when n is 3 and a C atom when n is 4; (3) any compound having the general structure $R^{12}$—$C(O)$—$N(R^{11})$—$R^{13}$—$N^+(R^7,R^8)$—$R^9$—$CO_2^-$, where $R^7$, $R^8$, $R^{11}$ and $R^{12}$ are the same or different carbon-containing group, amido carbon-containing group, ether carbon-containing group, or mixtures thereof, and $R^9$ and $R^{13}$ are the same or different alkenyl group, alkenyloxide group or mixtures thereof; (4) any compound having the general structure $R^{14}$—$[R^{15}$—$C(O)$—$N(R^{11})$—$R^{13}$—$N^+(R^7,R^8)$—$R^9$—$CO_2^-]_m$, where $R^7$, $R^8$ and $R^{11}$ are the same or different carbon-containing group, amido carbon-containing group, ether carbon-containing group, or mixtures thereof, $R^9$, $R^{13}$ and $R^{15}$ are the same or different alkenyl group, alkenyloxide group or mixtures thereof and $R^{14}$ is a multivalent substituent having a valency m between 2 and about 6; other similar ammonium acid zwitterionic agent; or mixtures or combinations thereof. Preferred zwitterionic compounds are betaines such as cocamidopropyl betaine, 5-(1-piperidiniomethyl)-1H-tetrazolide, or similar zwitterionic compounds. Other zwitterionic compounds for use in this invention include, without limitation, phospholipids capable of assuming a zwitterionic state such as phosphatidylcholine, phosphatidylserine, phosphalidylethanolamine, sphingomyelin and other ceramides, as well as various other zwitterionic phospholipids. Preferred sulfo-betaines and related zwitterionic compounds include, without limitation, N-Decyl-N,N-dimethyl-3-ammonio-1-propanesulfonate; Dimethylbenzyl-(3-sulfopropyl)ammonium; Dimethylethyl-(3-sulfopropyl)ammonium; Dimethyl-(2-hydroxyethyl)-(3-sulfopropyl)ammonium; 4-n-Hexylbenzoylamido-propyl-dimethylammoniosulfobetaine; -Methyl-N-(3-sulfopropyl)morpholinium; 4-n-Octylbenzoylamido-propyl-dimethylammoniosulfobetaine; 1-(3-Sulfopropyl) pyridium; N-Tetradecyl-N,N-Dimethyl-3-Ammonio-1-Propanesulfonate, or the like or mixtures or combination thereof.

Suitable winterizing agents include, without limitation, formate salts such as lithium formate, sodium formate, potassium formate, cesuim formate, triethyanolamine formate, or the like or mixtures or combinations.

Suitable foam boosters include, without limitation, cellosolves of the general formula $R^9OCH_2CH_2OH$ where $R^9$ is an alkyl group having between about 2 and about 8 carbon atoms or the like or mixtures or combinations. A preferred cellosolve is butylcellosolve. It should recognized by ordinary artisans that cellosolves are not considered environmentally friendly under all condition. Some of the cellosolves are toxic to mammals, but are not toxic to algae, bacteria or other microorganisms and are 80% or more biodegradable. Thus, environmentally friendly and biodegradable do not mean that every component in each formulation is environmentally friendly under all conditions or totally biodegradable, but that compared to many competitive foaming agents, the foaming agents of this invention have superior biodegradability and environmentally friendliness.

Suitable anti-freeze agents include, without limitation, alcohols, glycols or other freezing point depressing agents or the like or mixtures or combinations.

Suitable solvents include, without limitation, water, alcohols, ethers, esters or mixtures or combinations thereof. Preferred alcohols include, without limitation, methanol, ethanol, isopropanol, propanol, or the like or mixtures or combinations. Preferred ether include, without limitation, dimethyl ether, diethyl ether, dipropyl ether, methylethyl ether, methylpropyl ether, ethylpropyl ether, or the like or mixture or combinations thereof. Preferred esters include, without limitation, ethyl Ethyl Acetate, n-butyl Acetate, Ester Solvent EEP, Glycol Ether EB Acetate, or the like, propylene Based Glycol Ethers or the like, or mixtures or combinations thereof.

Suitable sodium salts of alpha olefin sulfonates (AOSs), include, without limitation, any alpha olefin sulfonate. Preferred AOSs including short chain alpha olefin sulfonates having between about 2 and about 10 carbon atoms, particularly, between 4 and 10 carbon atoms, longer chain alpha olefin sulfonates having between about 10 and about 24 carbon atoms, particularly, between about 10 and 16 carbon atoms or mixtures or combinations thereof.

Suitable additive that can be used in place of or in conjunction with AOS include, without limitation, cyclamic acid salts such as sodium (cyclamate), potassium, or the like, salts of sulfonated methyl esters having between about 12 and about 22 carbon atoms, where the salt is sodium, potassium, ammonium, alkylammonium, or the like such as Alpha-Step MC-48 from Stepan Corporation. Other additives includes salts of 2-aminoethane sulfonic acids, where the salt is an alkali metal, ammonium, alkylammonium, or like counterions.

Suitable nonionic surfactants, include, without limitation, polyalkylene oxide, amine oxides such as lauramine oxide or the like or mixtures or combinations.

Suitable fatty acids include, without limitation, lauric acid, oleic acid, stearic acid or the like or mixtures or combinations.

Suitable foam enhancer include, without limitation, a foam enhancer selected from the group consisting of a linear dodecyl benzene sulfonic acid salt, a sarcosinate salt, and mixtures or combinations thereof. Preferred linear dodecyl benzene sulfonic acid salt include, without limitation, ammonium linear dodecyl benzene sulfonic acid, alkylammonium linear dodecyl benzene sulfonic acid, alkanolamine ammonium linear dodecyl benzene sulfonic acid, lithium linear dodecyl benzene sulfonic acid, sodium linear dodecyl benzene sulfonic acid, potassium, cesium linear dodecyl benzene sulfonic acid, calcium linear dodecyl benzene sulfonic acid, magnesium linear dodecyl benzene sulfonic acid and mixtures or combinations thereof. Preferred sarcosinates include, without limitation, sodium lauryl sarcosinate, potassium lauryl sarcosinate, HAMPOSYL N-Acyl Sarcosinate Surfactants, Sodium N-Myristoyl Sarcosinate, and mixtures or combinations thereof.

Experimental Section

In all of the examples for making the foaming compositions described below, after all addition and mixing steps are completed, the final composition is filtered through a 1 μm filter to remove any solid residues and/or salts.

Foamer Preparation

EXAMPLE 1

This example illustrates the preparation of a preferred general purpose foaming agent of this invention.

To a 1000 gallon reactor was charged 1,024.94 lbs of deionized or reverse osmosis purified water or other purified waters, 1844.60 lbs of a cocamidopropylbetaine solution, Alpha 2442 Base available from Clearwater International, LLC of Houston, Tex., 922.30 lbs of Base 610-3.5 (85%) available from Clearwater International, LLC of Houston, Tex., an ammonium alcohol ether sulfate, and 3633.15 lbs of Base Hexyl-3.0 (90 wt. %) available from Clearwater International, LLC of Houston, Tex., another ammonium alcohol ether sulfate. The ingredients were added in the order shown. The Base 610-3.5 was heated and stirred prior to addition. The mixture was blended in the reactor for about 1 hour. The temperature of the mixture was then raised to between about 100° F. and about 120° F., which may be accomplished by preheating the Base Hexyl-3.0 (90 wt. %) and the Base 610-3.5 (85wt. %). This composition is referred to Foamer A. Foamer A was then tested. The product had the properties listed in Table I.

TABLE I

Product Properties

| Property | Value | Property | Value |
|---|---|---|---|
| specific gravity | 1.095 g/mL | pour point | −16° C. |
| appearance | clear liquid | color | amber-gold |
| initial ¼ Life[a] | 5:53 minutes | initial ½ Life[b] | 8:45 minutes |
| amount of defoamer[c] | 1.77 grams | ¼ Life A.D.[d] | 4:21 minutes |
| ½ Life A.D.[e] | 6:31 minutes | | |

[a]add 100 mL of tap water to Hamilton Beach Malt mixer add 3.0 grams of foamer, blend at high speed for 30 to 60 seconds, pour into 500 mL graduated cylinder, measure time to get 25 mL of liquid in graduated cylinder;
[b]add 100 mL of water to blender add 3.0 grams of foamer, blend at high speed for 30 to 60 seconds, pour into 500 mL graduated cylinder, measure time to get 50 mL of liquid in graduated cylinder;
[c]add sufficient defoamer to obtain 300 mL of foam;
[d]measure ¼ Life after defoamer addition;
[e]measure ½ Life after defoamer addition

EXAMPLE 2

This example illustrates the preparation of another preferred general purpose foaming agent of this invention.

To a 1000 gallon reactor was charged 1,510.70 lbs of water, 2718.83 lbs of a cocamidopropylbetaine solution, 1359.41 lbs of Base 610-3.5 (85%), an ammonium alcohol ether sulfate, and 5355.04 lbs of Base Hexyl-3.0 (90 wt. %), another an ammonium alcohol ether sulfate. The ingredients were added in the order shown. The Base 610-3.5 was heated and stirred prior to addition. The mixture was blended in the reactor for about 1 hour. The temperature of the mixture was then raised to between about 100° F. and about 120° F., which may be accomplished by preheating the Base Hexyl-3.0(90 wt. %) and the Base 610-3.5. The foaming composition was then tested. The product had the properties listed in Table II.

TABLE II

| Product Properties | | | |
|---|---|---|---|
| Property | Value | Property | Value |
| specific gravity | 1.08 g/mL | pour point | N/A |
| appearance | clear liquid | color | amber-gold |
| initial ¼ Life[a] | 6:08 minutes | initial ½ Life[b] | 9:04 minutes |
| amount of defoamer[c] | 1.05 grams | ¼ Life A.D.[d] | 3:34 minutes |
| ½ Life A.D.[e] | 5:31 minutes | | |

[a] add 100 mL of tap water to Hamilton Beach Malt mixer add 3.0 grams of foamer, blend at high speed for 30 to 60 seconds, pour into 500 mL graduated cylinder, measure time to get 25 mL of liquid in graduated cylinder;
[b] add 100 mL of water to blender add 3.0 grams of foamer, blend at high speed for 30 to 60 seconds, pour into 500 mL graduated cylinder, measure time to get 50 mL of liquid in graduated cylinder;
[c] add sufficient deformer to obtain 300 mL of foam;
[d] measure ¼ Life after defoamer addition;
[e] measure ½ Life after defoamer addition For foam heights greater than about 500 mL or in actual field use, use a 1000 mL graduated cylinder for measurements and measure 1 Life only.

CCT Testing of Base Foamer

Introduction

The tubing test was designed to experimental determine in a laboratory environment the feasibility of injecting certain products using coiled tubing. Foamer #1 was tested in three different dilutions: neat, 1:1 dilution in distilled water and 1:2 dilution in distilled water. Foam tests showed that the productivity of Foamer #1 was not affected by the high pressure and high temperature. The 1:2 dilution had the lowest pressure drop and viscosity. In applications, where a small concentration of foamer is needed, a 1:2 dilution or higher would be preferred. A neat injection would not be preferred due to the larger pressure drop through the tubing caused by the higher viscosity of neat Foamer #1. Furthermore, the neat Foamer #1 produces minimal amounts of solids under certain conditions; however, the solid content is insufficient to cause tubing blockage. And, any solid residues can be flushed w th water. All dilution o f Foamer #1 do not show solid formation, especially 1:1 or higher dilutions.

When selecting a dilution it is important to know the desired surfactant concentration required in the bottom of the well, the length of tubing required to reach the bottom of the well, and the estimated pressure drop through the tubing. A less dilute solution of Foamer #1 can be used if a higher concentration is desired and a pump is available to overcome the pressure drop. It is important not to use a solution that is too dilute because increasing the flow rate increases the pressure drop and pumping too much water can adversely affect well unloading.

Types of Test

Three types of test were run on the Foamer #1. The first type of test involved circulating the fluid through the system. The fluid is circulated through the heated portion of the tubing and then returned to the inlet holding tank. The fluid is allowed to circulate through the system slowly gaining heat until a maximum temperature of about 170° F. was reached. A sample was collected for analysis. This test was designed to mimic down hole conditions during operation. The fluid was flowing and was tested over a range of temperature, but at low pressure.

The second type of test was high temperature and low pressure. Once fluid was pumped through the heated tubing, the pump was shut off and the flow was stopped. The block valve to the pump was closed and the block valve at the exit was left open. This allows pressure due to heating and gas production, if present, to be vented to atmosphere. The fluid was left in the tubing for an adequate period of time to allow the fluid to reach a maximum temperature of about 212° F. After the desired period of time, a sample was collected for analysis. This test was designed to mimic a disruption in fluid pumping with pressure venting to the atmosphere. This test was performed to determine if solids would form under these conditions and block the tubing.

The third type of test was high temperature and high pressure. The testing fluid was stopped in the heated portion of the tubing. The valves on both sides of the heated portion of the tubing are closed and the pressure was allowed to increase. The pressure was vented occasionally to prevent over pressuring of the system. A relief valve was added to keep the pressure at about 2800 psi. The fluid was allowed to heat under pressure. Once the desired amount of time had elapsed, the valves were opened, the pump was turned on and a sample was collected for analysis. The maximum temperature reached during this type of test was approximately 280° F. This test was designed to mimic a situation where the pump was turned off and the pressure was blocked in.

Laboratory Capillary Coiled Tubing (CCT) Tests to Evaluate Foams

The test include (a) Solids —microwave evaporation to a constant weight. (a) Residue do not discolor or (b) Residue is liquid or paste; (b) Heat Stability Test to assess the composition for separation; (c) pH; (d) Specific gravity; (e) Pressure Drop (during test) for Neat, 1:1 dilution and 1:2 dilution; (f) Viscosity before/ after; (h) FTIR before/after; (I) Foam Test before/ after; (j) Color, indication of change, compare to FTIR; (k) Grind out, inspect any precipitate; (1) Filter solids, ANY, analysis for composition; (m) Pour Point Test; (n) Coefficient of friction before/ after; (o) Define compatibility: $Ca^{++}$ coefficient "$CaCl_2$", $Ba^{++}$ coefficient "$BaCl_2$" and Chloride tolerance, all performed on heated and non-heated samples; (p) Ether sulfates-Procedure to find sulfate ion; (q) Surface tension before/ after; and ;Du) Critical Micelle Concentration (CMC) before/ after.

Capillary Coiled Tubing (CCT) Certification Protocol

For CCT applications, a product that passes all tests may perform low foam height and ½ life but performs in all 4 solutions. Concentrations may be increased from 0.5 to 1.0 to as high as 3.0% nominal or higher if needed. If typical concentration performs and is thermally stable and effective before and after, use will supercede products with higher foam height and ½ life, which are not thermally stable. The product must meet criteria for ease of handling as pour point and minimal toxicity.

Explanation of Laboratory Test

Microwave Solids 1 gram of sample in 50 mL beaker heated at 15 sec intervals with 500 mL of tap water in a 600 mL beaker to absorb excess energy. Repeat measurements, do not allow water to exceed to hot to hold container (about 135 F to 150 F), change container. Repeat until 3 constant weights are obtained. Report % solids by microwave.

Note condition of solids. No charring allowed or burning or turning dark brown to black. Faint change of color to tan or minimal color from initial is OK.

Redissolve: minimal crystal residue. Let beaker stand till cool. Add 10 mL distilled water down side of beaker. Let stand 10 to 20 min, slowly swirl and sample must redissolve with no residue.

Heat Stability

Sample in neat form and in dilute form as used 1:1, 1:2, and 10% in some cases. In DI or RO water containing MeOH/EG/K or Na Formate/KCL—2% typically. In hot water bath static @ 70° C. for 2 hours: readings taken at 30 min/45 min/1 hr/1.5 hr/2.0 hr. No separation can occur, such as oil on top or precipitate on bottom or crystals on side or separation of liquid.

Range SG

Range SG is equal to ±0.03.

Density

Density is equal to ±0.25 #/gal.

Pressure Drop

During flow test for neat 1:1, 1:2 and any dilution used in field.

Viscosity

Viscosity is measured using a viscometer, a standard viscosity test.

FTIR

Fourier Transform IR spectra are run before and after testing. Interpret major peaks—No change is permitted. Associated dehydration and salt interactions can occur and are permitted.

Foam Test

Foam test uses a Lab Hamilton Beach Mixer. The mix procedure is mix on high for 45 sec to 60 sec, note any change at 15 sec. Concentrations tested are 0.5% and 1.0%. The solutions include (1) Tap water; (2) Saturated salt water—Prepare with sea salt (aquarium) concentrated. Purged with C02 to stabilize. Mix 24 hours with 12 hours purge, decant, and filter; (3) Tap water 90%/iso-octane 10%; and (4) Brine 90%/deodorized Kerosene 10%. The tests were carried out in a 1,000 mL graduates or tested in 500 mL graduates to determine if linear. Report ¼ life then ½ life. For excess of 600 mL foam height, the report height is >600 mL. Establish minimums from Foam Test of untreated verses all samples from flow test, heat test and pressure test.

Color

Instrument DR Lange calorimeter. Gardner scale for light colored solutions before heat test at 70 C and after 45 min at 70 C. Repeat before and after flow test for neat, 1:1 and 1:2 or any field dilution.

Grind Out

Standard API method, type and speed. Room Temperature (RT) Test are needed for neat, 1:1, 1:2 or any dilution used in field. At times of 3.0 min/5.0 min/10 min, no separation or layers allowed.

Freeze Thaw method: Cycle 1 (a) First centrifuge at RT for 10 min.; (b) 2 hours at 21° C.; (c) Centrifuge for 10 min; Cycle 2, repeat 1b and 1c; and Cycle 3, repeat 1b and 1c. No separation or layers allowed during any cycle.

Warm/RT method: Cycle 1: (a) First centrifuge at RT for 10 min; (b) 30 min at 70° C.; and (c) Centrifuge for 10 min; Cycle 2, repeat 1b and 1c; and Cycle 3, repeat 1b and 1c. No separation or layers allowed during any cycle.

Filtration

For Lab and Production Samples, filter-through simulated 1 micron filter screen, I Mr. Coffee filter. Filtrate—Centrifuge 10 min at 100% chemical. No separation of layers, no oil. BS&W establish as nil, no visible residue. All products are filtered through 1 micron filters before use.

Pour Point Test

Pour point test is typically run at (−) 21° C. (Need −15 to −20° C.), Low temperature freeze capable to −50 C minimal for "W", winterized formulas.

Coefficient of Friction

Run on lubricity instrument or derive from flow test on neat, 1:1, and 1:2 dilutions.

Ca Tolerance

Add 10 mL of sample to 100 mL of distilled water. Mix at room temp. Slowly add 11.8 lb/gal $CaCl_2$ heavy brine, synthetic, standard oil field for completion fluid, origin Tetra, drop wise to point where cloudiness or opaqueness occurs, record (A). Combine until precipitant forms, record (B). (A)—Cloud point; (B)—Precipitation point.

Ba Tolerance

Repeat above but titrate with $BaCl_2$ solution. (A)—Cloud point (B)—Precipitation point. Above titrations can be monitored by Zeta Potential.

Surface Tension

Standard surface tension measurement.

CMC

Critical Micelle Concentration is determined using standard methods.

Corrosion Test

The corrosion tests were performed at use concentration in 1) tap water and 2) sea water concentrated. Typically use is 2.5% chemical. Test with at least carbon steel 1010, stainless steel 2215 or metal being used in field.

Foam Test Results

All of the samples collected passed the foam test QC. Although some of the samples were discolored, there was no noticeable link between discoloration and ability to produce good stable foam. Even the samples that produced solids had acceptable foam test result. The concentration of foamer was keep constant in the 1:1 dilution and the 1:2 dilution at 0.5 grams of Foamer #1 for 100 grams of water. The concentration of neat Foamer #1 was higher 1 gram per 100 grams of water, but similar results are expected at 0.5 grams of neat Foamer #1 per 100 grams of water. The samples were also tested in a 100 grams water solution with 10 grams of saturated $CaCl_2$ solution added. The test results of samples with added $CaCl_2$ are shown in Table III. All the samples passed under these conditions.

TABLE III

Tubing Test Foam Test of Foamer #1, 1:1 Diluted Foamer #1 and 2:1 Diluted Foamer #1

| Product | Foamer grams | Foam Height mL | ¼ L min:sec | ½ L min:sec | Comments |
|---|---|---|---|---|---|
| Foamer #1 | 1.01 | 650+ | 6:01 | 8:51 | |
| Foamer #1 + 10 mL CaCl$_2$ | 1.09 | 650+ | 5:31 | 8:06 | |
| #1 sample | 1.06 | 650+ | 5:42 | 8:37 | |
| #1 sample + 10 mL CaCl$_2$ | 1.02 | 650+ | 5:30 | 8:08 | |
| #2 sample | 1.02 | 650+ | 5:56 | 8:50 | |
| #2 sample + 10 mL CaCl$_2$ | 1.02 | 650+ | 5:58 | 8:48 | |
| #3 sample | 1.04 | 650+ | 5:56 | 8:48 | |
| #3 sample + 10 mL CaCl$_2$ | 1.03 | 650+ | 5:54 | 8:26 | |
| #4 sample | 1.07 | 650+ | 5:30 | 8:01 | slightly cloudy |
| #4 sample + 10 mL CaCl$_2$ | 1.07 | 650+ | 5:27 | 7:47 | |
| #5 sample | 1.07 | 650+ | 5:35 | 8:17 | |
| #5 sample + 10 mL CaCl$_2$ | 1.06 | 650+ | 5:20 | 7:40 | |
| Water #1 | 1.06 | 50 | no ½ L | | |
| Foamer #1 1:1 | 1.02 | 650+ | 5:39 | 8:27 | |
| Foamer #1 1:1 + 10 mL CaCl$_2$ | 1.16 | 650+ | 5:36 | 8:10 | |
| #1 sample | 1.03 | 650+ | 6:14 | 9:02 | |
| #1 sample + 10 mL CaCl$_2$ | 1.05 | 650+ | 5:34 | 8:16 | |
| #2 sample | 1.00 | 650+ | 6:02 | 8:49 | |
| #2 sample + 10 mL CaCl$_2$ | 1.05 | 650+ | 5:41 | 8:13 | |
| #3 sample | 1.09 | 650+ | 6:07 | 8:51 | |
| #3 sample + 10 mL CaCl$_2$ | 1.05 | 650+ | 5:43 | 8:16 | |
| #4 sample | 1.08 | 650+ | 5:46 | 8:32 | |
| #4 sample + 10 mL CaCl$_2$ | 1.06 | 650+ | 5:21 | 7:48 | |
| Foamer #1 1:2 | 2.04 | 650+ | 5:34 | 8:24 | |
| Foamer #1 1:2 + 10 mL CaCl$_2$ | 2.03 | 650+ | 5:21 | 7:46 | |
| #1 sample | 2.10 | 650+ | 5:34 | 8:26 | |
| #1 sample + 10 mL CaCl$_2$ | 2.02 | 650+ | 5:47 | 8:05 | |
| #2 sample | 2.02 | 650+ | 5:57 | 8:46 | |
| #2 sample + 10 mL CaCl$_2$ | 2.01 | 650+ | 5:18 | 7:38 | |
| #3 sample | 2.04 | 650+ | 6:27 | 9:08 | |
| #3 sample + 10 mL CaCl$_2$ | 2.04 | 650+ | 5:32 | 7:53 | |

Types of sample time will be given next to each sample type
Type 1 circulation
Type 2 vent to atmosphere
Type 3 double block FTIR Results FTIR measurements showed that all of the different types of sample used in the tubing tests on the neat Foamer #1 had a reduction in the water peaks, while the Foamer #1 peaks remained about constant. During the circulation test there was evaporation through the top of the open inlet storage vessel. While the low pressure and high temperature test was running, there was steam coming from the open end of the system. After the high-pressure test, steam was let off when the pressure was vented. The dilution had similar results; the samples from the tests were slightly more concentrated than the original sample.

A sample was taken after some neat Foamer #1 was allowed to sit in the heated area over night with a vent to atmosphere, but instead of using Foamer #1 to push the sample out water was used. The results from the FTIR measurements on this sample showed that it had only a small amount of Foamer #1 in the solution. A foam test on this sample verified that it had very little Foamer #1. From this information, it appears that most of the Foamer #1 was flushed. The water easily removed the residue left in the system; thus it did not block the tubing. So in an actual case where the product is left in the tubing and heated with a vent to atmosphere, the tubing should not get blocked even though some solids were formed, due to the high pressure in the system.

% Solids Results

The % Solids test was consistent with the FTIR results. The tested samples of neat Foamer #1 had higher percent solids than the untested Foamer #1 as shown in Table IV. Thus, the samples had some water evaporated off and were more concentrated. The diluted samples showed the same results. The water sample was agreeable with FTIR results, there were very little solids. The sample was almost entirely water

TABLE IV

Tubing Test % Solids Foamer #1

| Product | % Solids | Product | % Solids |
|---|---|---|---|
| Foamer #1[a] | 63% | Foamer #1 1:1[a] | 31% |
| sample #1 | 71% | sample #1 | 36% |
| sample #2 | 67% | sample #2 | 34% |
| sample #3 | 68% | sample #3 | 35% |
| sample #4 | 68% | sample #4 | 34% |
| sample #5 | 69% | Foamer #1 1:2[a] | 21% |
| sample #6 | 70% | sample #1 | 22% |
| sample #1 water | 5% | sample #2 | 25% |
| | | sample #3 | 24% |

[a]foamer prior to introduction into the capillary coiled tubing

Viscosity Results

The viscosities of the more concentrated, tested samples were slightly higher than that of the original samples. The 1:1 dilution had a much lower viscosity than the neat Foamer #I. The 1:1 dilution and 1:2 dilution viscosities were approximately 77% and 87% lower than the viscosity of the neat Foamer #1. The mixture seems to be approaching the viscosity of water at a nonlinear rate. This makes the first dilution critical due to the large decrease in viscosity. The viscosity measurement are tabulated in Table V shown below.

TABLE V

Tubing Test Viscosity Foamer #1

| Product | Viscosity | % Change |
|---|---|---|
| Foamer #1[a] | 47.0 | |
| sample #1 | 65.0 | 38% |
| sample #2 | 61.6 | 31% |
| sample #3 | 58.0 | 23% |
| sample #4 | 58.0 | 23% |
| sample #5 | 64.0 | 36% |
| Foamer #1 1:1[a] | 10.4 | |
| sample #1 | 13.0 | 25% |
| sample #2 | 11.6 | 12% |
| sample #3 | 13.6 | 31% |
| sample #4 | 13.2 | 27% |
| Foamer #1 1:2[a] | 6.0 | |
| sample #1 | 6.0 | 0% |
| sample #2 | 6.5 | 8% |
| sample #3 | 6.5 | 8% | all viscosity measurements taken at room temperature ~72° F.

Pressure Drop Results

Figure 2:
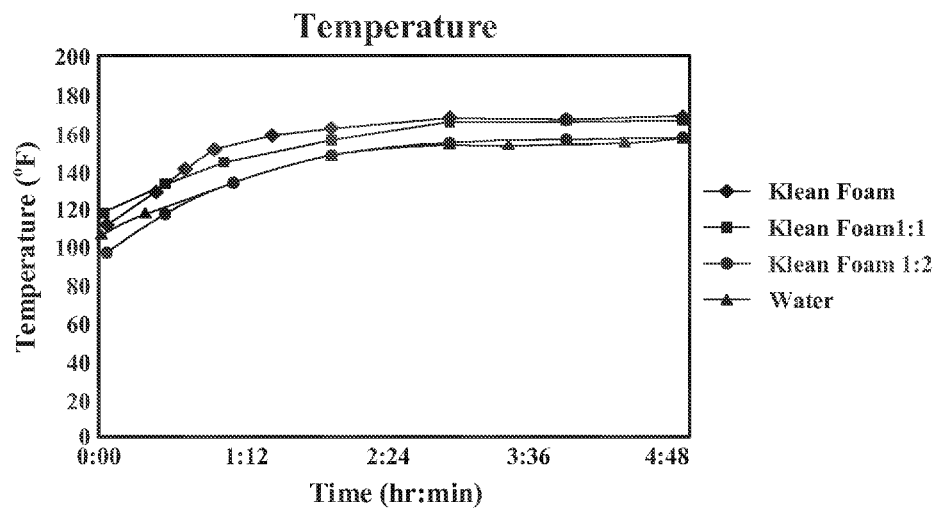
FIG. 2 depicts a plot of temperature v. time for neat foaming agent, a 1:1 water dilution and a 2:1 water dilution.

Fresh neat Foamer #1 was circulated through the system and measurement were taken of temperature, pressure, pressure drop and flow rate as tabulated in Table VI. The pressure drop for neat Foamer #1, the 1:1 dilution, the 1:2 dilution and water were determined at varying temperatures during the circulation test as tabulated in Table VII and shown in FIGS. 2 and 3. Although the viscosity was not determined over a range of temperatures it can be considered to be the major factor affecting the pressure drop. All other variables affecting pressure drop were held constant except for the density and the assumption was made that density was only slightly affected by change in temperature. The pressure drop of the different dilutions were consistent with the viscosity results. The reduction of pressure drop was also nonlinear. Thus, the first dilution had significant change in pressure drop then there were diminishing returns for the increase in dilution.

TABLE VI

Tubing Test Pressure Drop of Foamer #1

| Run | Time hr:min | Inlet Temperature ° F. | Outlet Temperature ° F. | Inlet Pressure psi | Outlet Pressure psi | Pressure Drop psi | Flow Rate gpm |
|---|---|---|---|---|---|---|---|
| 1 | 0:05 | n/a | 110 | 2000 | 400 | 1600 | unknown |
| 1 | 0:30 | 123 | 127 | 1650 | 310 | 1340 | 1 |
| 1 | 0:45 | 138 | 140 | 1450 | 275 | 1175 | 1 |
| 1 | 1:00 | 148 | 150 | 1350 | 250 | 1100 | 1 |
| 1 | 1:30 | 156 | 158 | 1250 | 250 | 1000 | 1 |
| 1 | 2:00 | 160 | 162 | 1240 | 250 | 990 | 1 |
| 1 | 3:00 | 167 | 168 | 1240 | 250 | 990 | 1 |
| 1 | 4:00 | n/a | 168 | 1200 | 250 | 950 | 1 |
| 1 | 5:00 | 170 | 170 | 1240 | 250 | 990 | 1 |
| 2 | 0:05 | n/a | 116 | 2000 | 400 | 1600 | unknown |
| 2 | 0:15 | n/a | 122 | 2000 | 390 | 1610 | unknown |
| 2 | 0:40 | n/a | 140 | 1600 | 310 | 1290 | 1 |
| 2 | 1:30 | n/a | 160 | 1400 | 290 | 1110 | 1 |
| 2 | 2:45 | n/a | 164 | 1370 | 285 | 1085 | 1 |
| 2 | 3:45 | n/a | 168 | 1350 | 280 | 1070 | 1 |
| 2 | 5:10 | n/a | 171 | n/a | 260 | n/a | 1 |
| 2 | 6:00 | n/a | 174 | 1350 | 260 | 1090 | 1 |
| 2 | 7:30 | n/a | 174 | 1350 | 250 | 1100 | 1 |

Run #1 was performed on fresh Foamer #1. The sample was circulated through the system for 5 hours.
Run #2 was performed the next day on the same Foamer #1 from the day before that was a cooled over night. The top of the inlet tank is open to atmosphere so some evaporation did occur. The volume was not mea'sure so the amount evaporated could not be determined.
The increase in pressure drop is due to the increase in viscosity which was brought about by evaporating some of the solvents. We will run a displacement test to determine if there was build up in the tubing.

TABLE VII

Tubing Test Pressure Drop Water and Foamer #1 1:1 and 1:2 in DI Water

| Run | Time hr:min | Inlet Temperature ° F. | Outlet Temperature ° F. | Inlet Pressure psi | Outlet Pressure psi | Pressure Drop psi | Flow Rate gpm |
|---|---|---|---|---|---|---|---|
| Water | 0:02 | 96 | 104 | 600 | 150 | 450 | 1 |
| | 0:25 | 112 | 116 | 560 | 150 | 410 | 1 |
| | 2:00 | 147 | 148 | 550 | 150 | 400 | 1 |
| | 3:30 | 153 | 154 | 525 | 150 | 375 | 1 |
| | 4:30 | 156 | 156 | 510 | 150 | 360 | 1 |
| | 5:00 | 157 | 158 | 500 | 150 | 350 | 1 |
| Foamer #1 1:1 Dilution | 0:04 | 85 | 116 | 1300 | 250 | 1050 | 1 |
| | 0:35 | 129 | 132 | 1000 | 240 | 760 | 1 |
| | 1:05 | 142 | 144 | 940 | 240 | 700 | 1 |
| | 2:00 | 154 | 156 | 860 | 220 | 640 | 1 |
| | 3:00 | 165 | 166 | 820 | 220 | 600 | 1 |
| | 4:00 | 167 | 167 | 810 | 220 | 590 | 1 |
| | 5:00 | 168 | 168 | 810 | 220 | 590 | 1 |

TABLE VII-continued

Tubing Test Pressure Drop
Water and Foamer #1 1:1 and 1:2 in DI Water

| Run | Time hr:min | Inlet Temperature ° F. | Outlet Temperature ° F. | Inlet Pressure psi | Outlet Pressure psi | Pressure Drop psi | Flow Rate gpm |
|---|---|---|---|---|---|---|---|
| Foamer #1 | 0:05 | 90 | 95 | 800 | 220 | 580 | 1 |
| 1:2 Dilution | 0:35 | 114 | 116 | 750 | 210 | 540 | 1 |
| | 1:10 | 131 | 133 | 720 | 205 | 515 | 1 |
| | 2:00 | 144 | 148 | 700 | 200 | 500 | 1 |
| | 3:00 | 152 | 155 | 700 | 200 | 500 | 1 |
| | 4:00 | 154 | 157 | 700 | 200 | 500 | 1 |
| | 5:15 | 158 | 160 | 700 | 195 | 505 | 1 |

Foamer #1 neat
1 sample, stopped in heated area of tubing for 30 min with vent to atmosphere
2 sample, stopped in heated area of tubing for 30 min, double blocked in, pressure from 500 to 2000 psi
3 sample, circulated in system for 5 hours, with top of holding tank exposed to atmosphere
4 sample, stopped in heated area of tubing for 2 hours, double blocked in, pressure from 500 to 2000 psi
5 sample, stopped in heated area of. tubing overnight, vented to atmosphere
Water #1, stopped in the tubing overnight with vent to atmosphere, rinsed with water instead of Foamer #1

Conclusion

The three types of test showed experimentally what would happen under certain circumstances. The tests showed that Foamer #1 represents a roamer for use in CCT application. Preferably, a diluted Foamer #1 should be used to decrease the pressure drop through the tubing and to prevent the formations of solids that may form from the use of neat Foamer #1.

Viscosity was determined to be the major factor affecting pressure drop through the tubing. A significant reduction of the viscosity can be obtained with a 1:1 dilution. Any further dilutions do not produce as large a change in viscosity as the first dilution. The dilution used in the field should be determined by the reduction in pressure drop required and the concentration of Foamer #1 desired. The flow rate in this experiment was held constant. When using Foamer #1 or a dilution thereof in the field, it should be noted that if the product is diluted too much then the flow rate would have to be increased and this will have a dramatic effect on the pressure drop. If the flow rate were not increased, then the time required to inject the desired amount of Foamer #1 would have to be increased.

Base Foamer Composition with Augmenting Additives

EXAMPLE 3

This example illustrates the preparation of another preferred general purpose foaming agent of this invention including potassium formate.

To a 1000 gallon reactor was charged 1851.20 lbs of water, 3331.20 lbs of a cocamidopropylbetaine solution, 1665.60 lbs of Base 610-3.5 (85wt. %), an ammonium alcohol ether sulfate, 6561.6 lbs of Base Hexyl-3.0 (90 wt. %), an ammonium alcohol ether sulfate, and 2590.40 of potassium formate (60wt. %). The ingredients were added in the order shown. The Base 610-3.5 was heated and stirred prior to addition. The mixture was blended in the reactor for about 1 hour. The temperature of the mixture was then raised to between about 1 00° F. and about 120° F., which may be accomplished by preheating the Base Hexyl-3.0 (90 wt. %) and the Base 610-3.5. The foaming composition had a specific gravity of 1.136 g/mL and was a clear liquid having an amber-gold color.

EXAMPLE 4

This example illustrates a study of potassium formate (KF) modification of the compositions of Examples 1 and 2, having different amount of potassium formate all giving clear compositions that stayed clear for at least 3 minutes. It should be recognized that hazing can occur if the amount of potassium formate is not carefully controlled. Table VIII tabulates the results of added potassium formate to the Foamer #1 composition.

TABLE VIII

Potassium Formate Winterization Optimization Results

| Run | KF Solution |
|---|---|
| 1 | Add 2.31 gms of water to 83.81 gms of product, then 6.66 gms of water, and then 5.70 gms of 70% KF solution - mix was clear |
| 2 | Add 1.92 gms of 75% KF solution to 83.82 gms of product (2.2% KF) - mix 5 minutes product was clear |
| 3 | Add 1.01 gms of 60% KF solution to 83.81 gms of product (1.2% KF) - mix 5 minutes product was clear |
| 4 | Add 1.34 gms of 60% KF solution to 83.81 gms of product (1.6% KF) - mix 3 minutes product was clear |
| 5 | Add 0.90 gms of 75% KF solution to 83.80 gms of product (1.77% KF) - mix 4 minutes product was clear |
| 6 | Add 10.30 gms of water to 83.81 gms of product, and then 2.14 gms of 75% KF solution - mix was clear |
| 7 | Add 1.71 gms of 60% KF solution to 83.81 gms of product (1.2% KF) - product was clear |
| 8 | Add 2.54 gms of 60% KF solution to 83.81 gms of product (3.03% KF) - mix 5 minutes product was clear |

EXAMPLE 5

This example illustrates the preparation of another preferred general purpose foaming agent of this invention including additives to make the composition oil tolerant-via the addition AOS sometimes referred to herein as Foamer #2.

Foamer #2 was prepared by charging an appropriately sized reactor with 6.90 wt. % of water, 12.42 wt. % of a cocamidopropylbetaine solution, 6.22 wt. % of Base 610-3.5 (85%), an ammonium alcohol ether sulfate, 24.47 wt. % of Base Hexyl-3.0 (90 wt. %), an ammonium alcohol ether sulfate. The ingredients were added in the order shown. The Base 610-3.5 was heated and stirred prior to addition. The mixture was blended in the reactor for about 1 hour. The temperature of the mixture was then raised to between about 100° F. and about 120° F., which may be accomplished by preheating the Base Hexyl-3.0 (90 wt. %) and the Base 610-3.5. After the base formula was prepared, 10 wt. % of methanol was added followed by 50 wt. % of an alpha-olefin sulfonate such as 12 to 14 carbon atoms ammonium or sodium salts.

EXAMPLE 6

This example illustrates Foamer #1 and Foamer #2 in comparative tests with other foaming compositions under actual well conditions. Tables IX-XIII tabulates the results of

TABLE IX

New Mexico Fluids

| Products | Grams | FH | ¼ L | ½ L |
|---|---|---|---|---|
| 10# Brine (Make-up) | | | | |
| CorrFoam 5050 | 1.03 | 580 | 5:02 | 7:34 |
| CorrFoam 5050 plus | 1.00 | 550 | 4:58 | 8:32 |
| Unichem 9120 | 0.50 | 580 | 4:25 | 7:02 |
| WFT F104 | 0.53 | >600 | 6:46 | 9:53 |
| FOAMER #1 | 0.64 | >600 | 5:16 | 7:50 |
| Produced Water (Return) | | | | |
| CorrFoam 5050 | 1.02 | 340 | 2:27 | 4:20 |
| CorrFoam 5050 plus | 1.02 | 280 | 0:48 | 1:33 |
| Unichem 9120 | 0.51 | 440 | 5:05 | 7:42 |
| WFT F104 | 0.53 | 300 | 1:18 | 2:32 |
| FOAMER #1 | 0.65 | 580 | 5:26 | 7:58 |

TABLE X

New Mexico Foam Test

| Products | Grams | FH | ¼ L | ½ L |
|---|---|---|---|---|
| Return Water from Well New Mexico[a] (1 quart) | | | | |
| WFT F104 (New 5 gal) 33367[c] | 1.86 | 460 | 5:50 | 8:28 |
| UNICHEM 9120[d] | 2.14 | 110 | no ½ L | |
| CorrFoam 5050[c] | 3.27 | 460 | 4:50 | 7:07 |
| Sonora Chemical 6500[c] | 3.01 | 590 | 5:14 | 7:50 |
| FOAMER #1[c] | 2.40 | 475 | 4:27 | 6:41 |
| WFT FMA 100[c] | 2.29 | 425 | 4:58 | 7:21 |
| New Mexico 10# Brine (only SG = 1.052)[b] (1 quart) | | | | |
| WFT F104 (New 5 gal) 33367 | 0.54 | 530 | 6:45 | 9:50 |
| UNICHEM 9120 | 0.54 | 560 | 5:21 | 7:42 |
| CorrFoam 5050 | 1.04 | 580 | 5:00 | 7:11 |
| Sonora Chemical 6500 | 0.53 | 540 | 7:03 | 10:16 |
| FOAMER #1 | 0.54 | 650+ | 6:01 | 8:48 |
| WFT FMA 100 | 0.54 | 650+ | 5:11 | 7:34 |

[a]separated thin oil layer from top and didn't use; 2nd quart very oily, lots of black solid, left most in jar, little in test, VERY DARK;
[b]Brine is clean with little solids;
[c]RGS;
[d]No Foam

TABLE XI

Odessa, TX Foam Test

| Products | Grams | FH | ¼ L | ½ L |
|---|---|---|---|---|
| Odessa, TX 9# Brine (1 quart) | | | | |
| WFT F104 (New 5 gal) 33367 | 0.54 | 330 | 7:20 | 12:53 |
| UNICHEM 9120 | 0.55 | 260 | 0:48 | 2:03 |
| CorrFoam 5050 | 1.07 | 465 | 8:18 | 12:17 |
| Sonora Chemical 6500 | 0.52 | 140 | no ½ L | |
| FOAMER #1[a] | 0.54 | 600+ | 8:40 | 12:25[a] |
| WFT FMA 100[a] | 0.53 | 600+ | 7:54 | 11:31[a] |
| Odessa, TX o55 sample 1% KCL (1 quart) | | | | |
| WFT F104 (New 5 gal) 33367 | 0.55 | 565 | 7:44 | 11:14 |
| UNICHEM 9120 | 0.54 | 595 | 5:11 | 7:35 |
| CorrFoam 5050 | 1.05 | 600 | 4:14 | 6:21 |
| Sonora Chemical 6500 | 0.53 | 600 | 7:17 | 10:43 |
| FOAMER #1 | 0.50 | 600+ | 6:12 | 8:57 |
| WFT FMA 100 | 0.51 | 600+ | 5:10 | 7:46 |

[a]RGS

TABLE XII

East Texas Carthage Foam Test

| Products | Grams | FH | ¼ L | ½ L |
|---|---|---|---|---|
| Makeup Water CARTEX Disposal Carthage, TX | | | | |
| WFT F104 Round Jar | 0.57 | 340 | 4:29 | 9:00 |
| Champion CI Foamer 577[a] | 0.59 | 145 | 0:00 | 0:00 |
| CorrFoam 5050[b] | 0.60 | 315 | 2:33 | 5:12 |
| FOAMER #1[c] | 0.52 | 580 | 6:54 | 10:21 |
| WFT-FMA 100 | 0.63 | >600 | 6:40 | 9:52 |
| Makeup Water Carthage City Water | | | | |
| WFT F104 Round Jar | 0.57 | >600 | 7:44 | 11:45 |
| Champion CI Foamer 577 | 0.56 | 380 | 3:46 | 6:25 |
| CorrFoam 5050 | 0.62 | 420 | 3:31 | 5:23 |
| FOAMER #1[d] | 0.59 | >600 | 6:05 | 9:03 |
| WFT-FMA 100[e] | 0.60 | >600 | 5:36 | 8:25 |
| Makeup Water Devon Energy-Carthage | | | | |
| WFT F104 Round Jar | 0.52 | 600 | 7:56 | 11:30 |
| Champion CI Foamer 577 | 0.59 | 230 | 1:03 | 1:45 |
| CorrFoam 5050 | 0.58 | 420 | 3:25 | 5:20 |
| FOAMER #1 | 0.62 | 600 | 5:56 | 8:45 |
| WFT-FMA 100 | 0.59 | 600 | 5:28 | 8:11 |

[a]Fe stays dispersed;
[b]Fe precipitates to bottom;
[c]Thick;
[d]almost will not pour;
[e]will not pour - Net 520

TABLE XIII

East Texas Foam Test

| Products | Grams | FH | ¼ L | ½ L |
|---|---|---|---|---|
| Produced Water DeBerry,[Tx a] (1 quart) | | | | |
| WFT F104 (New 5 gal) 33367 | 0.55 | 235 | 0:42 | 1:48 |
| Champion CI/F 577 1 qt. MR | 1.01 | 130 | | no ½ L |
| CorrFoam 5050 | 1.01 | 385 | 6:18 | 7:43 |
| CorrFoam 5050 plus DRD 02-148 | 1.01 | 315 | 4:10 | 7:28 |
| FOAMER #1 | 0.55 | 510 | 7:32 | 10:54 |
| WFT FMA 100 | 0.57 | 560 | 6:36 | 9:42 |
| Produced Water Carthage, TX (1 quart) | | | | |
| WFT F104 (New 5 gal) 33367 | 0.51 | 370 | 7:42 | 11:46 |
| Champion CI/F 577 1 qt. MR | 1.01 | 145 | | no ½ L |
| CorrFoam 5050 | 1.02 | 375 | 7:32 | 11:41 |
| CorrFoam 5050 plus DRD 02-148 | 1.07 | 340 | 4:32 | 7:37 |
| FOAMER #1 | 0.56 | 485 | 6:26 | 9:12 |
| WFT FMA 100 | 0.52 | 550 | 6:46 | 9:47 |
| Total/Fina DeBerry, TX (1 gallon) | | | | |
| WFT F104 (New 5 gal) 33367[b] | 0.58 | 110 | | no ½ L |
| Champion CI/F 577 1 qt. MR[c] | 1.02 | 100 | | no ½ L |

TABLE XIII-continued

East Texas Foam Test

| Products | Grams | FH | ¼ L | ½ L |
|---|---|---|---|---|
| CorrFoam 5050 | 1.00 | 175 | 0:31 | 1:00 |
| CorrFoam 5050 plus DRD 02-148 | 1.01 | 165 | 0:25 | 0:43 |
| FOAMER #1 | 0.50 | 250 | 0:27 | 2:52 |
| WFT FMA 100 | 0.55 | 340 | 3:21 | 6:16 |
| Key Water from WFT$^d$ (1 quart about 250 mL) | | | | |
| Champion CI/F 577 1 qt. MR | 1.08 | 520 | 4:53 | 7:06 |
| CorrFoam 505 | 11.07 | 530 | 4:00 | 6:16 |
| Total/Fina Carthage,$^{Txe}$ Produced Water 100/oil 10 (1 gallon) | | | | |
| WFT F104 (New 5 gal) 33367 | 2.24 | 135 | 0:17 | 0:28 |
| Champion CI/F 577 1 qt. MR$^f$ | 3.05 | 110 | | no ½ L |
| CorrFoam 5050 | 3.40 | 200 | 1:37 | 2:13 |
| FOAMER #2 | 2.02 | 225 | 0:33 | 1:10 |
| FOAMER #1$^g$ | 2.03 | 365 | 2:57 | 5:11 |
| WFT FMA 100 | 2.06 | 305 | 1:56 | 3:21 |

$^a$Oily with lots of red in and a strong oil smell;
$^b$Little froth and foam;
$^c$No Foamcontinued on next page
$^d$has flakes;
$^e$Run with 100 mL produced water and 10 ml oil (high gravity condensate);
$^f$No Foam;
$^g$RGS The field data indicates that the compositions of this invention are well-suited for downhole operations and have either comparable or superior properties than competitive products that do not include a zwitterionic compound.

EXAMPLE 7

This example illustrates Foamer #1 and other foaming compositions in shale test. The Capillary Suction Time (CST) data as reported below represented an average of at least three (3) points. All shale was ground and used at 2 wt. % in deionized water. All samples were hydrated for a minimum of 24 hours to provide stable and reproducible results. The shale was Evergreen Resources shale from the Royal Gorge Area, one shale was from 1467 feet and the other was from 2640 feet. Table XIV tabulates the results of

TABLE XIV

Shale Foam and Loss Data

| Product | 0.25 wt. % | 0.5 wt. % | 0.75 wt. % | 1.0 wt. % |
|---|---|---|---|---|
| 2 wt. % - 1467 foot Shale | | | | |
| Blank 138.5 | | | | |
| Dionic 900$^a$ | 55.2 | 153.3 | 474.9 | 469.2 |
| 70 wt. % KF$^b$ | 35.0 | 43.8 | 51.2 | 51.8 |
| CC-300KF$^c$ | 100.1 | 210.7 | 428.9 | 674.1 |
| Foamer #1 | 33.9 | 52.4 | 282.4 | 364.8 |
| Foamer #1 + 1 wt. % KF$^a$ | 130.4 | 120.2 | n/a | 309.3 |
| Foamer #1 + 0.25 wt. % Dionic 900$^a$ | 334.7 | n/a | n/a | n/a |
| 2 wt. % - 2640 foot Shale | | | | |
| Blank 119.6 | | | | |
| Dionic 900 | 127.2 | 142.9 | 138.9 | 235.7 |
| 70 wt. % KF$^a$ | 92.5 | 98.8 | 87.6 | 80.4 |
| CC-300KF$^b$ | 276.1 | 180.0 | 164.4 | 231.8 |
| Foamer #1 | 64.3 | 62.6 | 102.2 | 108.1 |
| Foamer #1 + 1 wt. % KF$^a$ | n/a | 36.3 | n/a | 32.7 |
| Foamer #1 + 0.25 wt. % Dionic 900$^a$ | 50.4 | n/a | n/a | n/a |

TABLE XIV-continued

Shale Foam and Loss Data

| Product | 0.25 wt. % | 0.5 wt. % | 0.75 wt. % | 1.0 wt. % |
|---|---|---|---|---|
| Foamer #1 + 1.0 wt. % Dionic 900$^a$ | n/a | 367.1 | n/a | n/a |

$^a$Comparison foamer;
$^b$KF - 70 wt. % aqueous solution of potassium formate;
$^c$Comparison foamer

EXAMPLE 8

This example illustrates Foamer #1 tested in a 3 wt. % shale solution using a Zeta meter. Table XV tabulates the results of the test, each point represents an average of 10 measurements. The tests used shale from Evergreen.

TABLE XV

Shale Foam Test Using Zeta Meter

| Product | wt. % | Zeta Value |
|---|---|---|
| Blank | | −30 |
| Foamer #1 | .025 | −27 |
| Foamer #1 | 0.5 | −27 |
| Foamer #1 | 0.75 | −26 |
| Foamer #1 | 1.0 | −22 |
| Foamer #1 | 2.0 | −19 |
| Foamer #1 | 3.0 | −16 |
| Foamer #1 | 5.0 | −12 |

EXAMPLE 9

This example illustrates Foamer #1 and Foamer #2 and other foaming compositions in foamer/defoamer tests. Tables XVI-XVIII tabulates the results of tests.

TABLE XVI

Foamer and Defoamer Combinations in Tap Water

| Product/Defoamer | Grams | FH | ¼ L | ½ L | DF grams | DF FH |
|---|---|---|---|---|---|---|
| F-104/DF-104 | 1.02 | 600+ | 7:18 | 11:13 | 4.66 | 300 |
| F-104/DF-104 | 1.60 | 600 | 5:20 | 7:49 | 5.37 | 250 |
| F-104/DF-104 | 1.62 | 600+ | 6:17 | 9:02 | 6.30 | 250 |
| F-104/DF-104 | 1.46 | 600+ | 7:58 | 11:23 | | |
| Foamer #2/DF 6EA | 1.03 | 600+ | 7:15 | 10:46 | 3.2 | 300 |
| Foamer #2/DF 6EA | 1.61 | 450 | 4:01 | 6:31 | 1.87 | 160 |
| Foamer #2/DF 6EA | 1.60 | 540 | 3:56 | 5:55 | 1.56 | 180 |
| Foamer #2/DF 6EA | 1.78 | 580 | 4:28 | 6:22 | 3.9 | 240 |
| Foamer #2/DF 6EA | 1.87 | 580 | 4:56 | 7:17 | | |
| Foamer #1 + HEC/XL | 1.39 | 600+ | 5:15 | 8:06 | 9:71 | |
| Foamer #2/DF ES8 | 1.00 | 600+ | 7:05 | 10:37 | 8.38 | 300 |
| Foamer #2/DF ES8 | 1.55 | 245 | failed | | | |
| F-104/DF 104 | 1.03 | 600+ | 7:05 | 10:34 | 4:64 | 250 |
| F-104/DF 104 | 1.82 | 560 | 2:36 | 4:35 | 5.37 | 260 |
| F-104/DF 104 | 1.62 | 310 | 0:55 | 1:58 | | |
| Foamer #2/DF ES10 | 1.00 | 600+ | 7:13 | 10:40 | 8:26 | 300 |
| Foamer #2/DF ES10 | 1.54 | 250 | failed | | | |
| Foamer #2/DF Ester #1 | 1.00 | 600+ | 7:05 | 10:26 | 6:33 | 350 |
| Foamer #2/DF Ester #1 | 1.60 | 240 | failed | | | |

TABLE XVII

Foamer and Defoamer Combinations in CaCl₂ and Oil

| Product/Defoamer | Grams | FH | ¼ L | ½ L | DF grams | DF FH |
|---|---|---|---|---|---|---|
| F-104 (dark)/DF-104 (dark) | 1.01 | 570 | 7:09 | 10:40 | 7.1 | |
| F-104 (dark)/DF-104 (dark) | 1.07 | <100 | failed | | | |
| F-104 (new)/DF-104 (new) | 1.04 | 590 | 7:10 | 10:34 | 4.09 | |
| F-104 (new)/DF-104 (new) | 1.05 | 430 | 2:21 | 4:34 | | |
| F-104 (sr)/DF-104 (sc)[a] | 1.01 | 600+ | 7:04 | 11:08 | 6.71 | |
| F-104 (sr)/DF-104 (sc)[a] | 1.00 | 520 | | 6:41 | 0.69 | |
| +10 mL iso-octane | 1.09 | 600 | 6:10 | 9:10 | 2.84 | |
| +10 mL - 14 g CaCl₂ | 1.02 | 145 | no ½ L | | | |
| +HEC 1.05, blended 8 min. | 1.82 | 155 | 0:30 | 1:09 | na | |
| +HEC 1.07, Drispac 1.01 | 3.11 | 150 | >60 (gel) | | | |
| Foamer #1/DF 6EA-1412-3 | 1.11 | 650+ | 6:07 | 8:55 | 0.92 | |
| Foamer #1/DF 6EA-1412-3 | 1.00 | 600+ | 4:27 | 6:59 | 1.93 | |
| +10 mL iso-octane | 1.14 | 430 | 3:02 | 4:00 | na | |
| +10 mL - 14 g CaCl₂ | 1.04 | 450 | 3:12 | 5:18 | na | |
| +HEC 1.08, blended 8 min. | 2.34 | 335 | >60:00 | | | |
| Foamer #2/DF 6EA-1412-3 | 1.18 | 650+ | 7:47 | 11:17 | 2.31 | |
| Foamer #2/DF 6EA-1412-3 | 1.03 | 590 | 4:30 | 6:28 | 1.51 | |
| +10 mL iso-octane | 1.09 | 340 | 2:50 | 4:25 | na | |
| +10 mL - 14 g CaCl₂ | 1.04 | 150 | no ½ L | | na | |
| +HEC 1.28, blended 8 min. | 1.93 | 225 | >60:00 did not separate | | | |
| Foamer #2/DF 6EA+LPA-210 | 1.17 | 600+ | 7:04 | 10:30 | 2.07 | |
| Foamer #2/DF 6EA+LPA-210 | 1.01 | 525 | 4:27 | 6:24 | 0.62 | |
| +10 mL iso-octane | 1.13 | 520 | 5:16 | 7:57 | 0.72 | |
| +10 mL - 14 g CaCl₂ | 1.11 | 225 | 0:58 | | | |
| +HEC 1.09, blended 8 min. | 2.16 | 260 | 13:12 | 23:33 | | |
| Foamer #2/DF Ester #1 | 1.05 | 600+ | 6:42 | 10:06 | 2.15 | |
| Foamer #2/DF Ester #1 | 1.03 | 570 | 4:16 | 6:19 | 1.4 | |
| +10 mL iso-octane | 1.17 | 340 | 2:35 | 4:20 | na | |
| +10 mL - 14 g CaCl₂ | 1.02 | 110 | no ½ L | | na | |
| +HEC 1.17, blended 8 min. | 1.94 | 250 | 24:00 | >60:00 | | |

HEC - hydroxy-ethyl cellulose

TABLE XVIII

Foamer and Large Amount of Defoamer Combinations in Tap Water

| Product/Defoamer | Grams | FH | ¼ L | ½ L | DF grams | DF FH |
|---|---|---|---|---|---|---|
| F-104/DF-104 | 1.49 | 650+ | 6:41 | 10:04 | 9:97 | |
| F-104/DF-104 (cloudy film) | 1.08 | 180 | | 1:39 | failed | |
| F-104/DF-104 | 1.85 | 650+ | 6:40 | 9:54 | 12:78 | |
| F-104/DF-104 | 1.09 | failed | | | | |
| Foamer #1/DF 6AE-1412-3 | 1.71 | 650+ | 5:18 | 8:07 | 1.03 | |
| Foamer #1/DF 6AE-1412-3 | 1.10 | 650+ | 4:24 | 6:40 | 5.04 | |
| Foamer #1/DF 6AE-1412-3 | 1.28 | 560 | 4:34 | 6:40 | 1.07 | |
| Foamer #1/DF 6AE-1412-3[a] | 1.24 | 600 | 4:55 | | 6.92 | |
| Foamer #1/DF 6AE-1412-3 | 2.27 | 580 | 5:24 | 7:50 | | |
| Foamer #2/DF 6AE-1412-3 | 1.56 | 650+ | 7:08 | 10:51 | 1.79 | |
| Foamer #2/DF 6AE-1412-3 | 1.18 | 600+ | 4:34 | 7:38 | 5.08 | |
| Foamer #2/DF 6AE-1412-3 | 1.20 | 560 | 4:38 | 6:57 | 1.06 | |
| Foamer #2/DF 6AE-1412-3[a] | 1.25 | 600 | 4:32 | | 6.07 | |
| Foamer #2/DF 6AE-1412-3 | 2.21 | 600 | 5:15 | 7:40 | | |
| Foamer #3[b]/DF 6AE-1412-3 | 1.59 | 650+ | 7:13 | 11:22 | 1.20 | |
| Foamer #3[b]/DF 6AE-1412-3 | 1.05 | 650+ | 5:09 | 8:10 | 5.06 | |
| Foamer #3[b]/DF 6AE-1412-3 | 0.96 | 550 | 4:35 | 6:57 | 0.88 | |
| Foamer #3[b]/DF 6AE-1412-3 | 1.12 | 560 | 4:34 | | 3.48 | |
| Foamer #3[b]/DF 6AE-1412-3 | 2.21 | 580 | 4:41 | 6:57 | | |
| Foamer #1/DF 6AE-1412-3 | 1.56 | 650+ | 5:51 | 8:39 | 0.55 | |
| Foamer #1/DF 6AE-1412-3[c] | 1.15 | 650+ | 4:38 | 7:31 | | |
| Foamer #1 + AOS/DF 6AE-1412-3 | 1.08/0.62 | 650+ | 6:48 | 10:04 | 1.58 | |
| Foamer #1+ AOS/DF 6AE-1412-3[c] | 0.68/0.53 | 650+ | 4:36 | 7:34 | 8.32 | |
| F-104/DF 6AE-1412-3 | 1.48 | 650+ | 6:25 | 9:49 | 1.00 | |
| F-104/DF 6AE-1412-3 | 1.01 | 540 | 3:38 | 5:43 | 5.84 | |
| F-104/DF 6AE-1412-3 | 0.97 | 480 | 3:22 | 5:36 | 0.69 | |
| F-04/DF 6AE-1412-3[a] | 1.07 | 600 | 4:16 | | 6.39 | |
| F-104/DF 6AE-1412-3 | 2.11 | 585 | 5:45 | 8:32 | | |

[a]heavy foam break;
[b]Foamer #1: AOS:MeOH (36/55/10);
[c]removed early

EXAMPLE 10

This example illustrates Foamer #1, Foamer #2 and a control foaming compositions F104 using in a recycle system. The recycle foam test data is tabulated in Tables XIX-XX.

chain alcohols of about 6 to about 14 carbon atoms and about 3 moles of ethylene oxide. The deformers can also include dyes to facilitate ease of distinguishing them and when testing ½ Life or other tests in the field. It has been found that mixtures of alcohol ethoxylates having different alcohol start-

TABLE XIX

Foamer and Large Amount of Defoamer Combinations in Tap Water

| Cycle | F104[a]/DF104[b] ½ Life/FH[g] | F1[c]/DF8[d] ½ Life/FH[g] | F1/DF9[e] ½ Life/FH[g] | F2[f]/DF8 ½ Life/FH[g] | F2/DF9 ½ Life/FH[g] |
|---|---|---|---|---|---|
| F/FD[h] | 8:44/690 | 6:50/720 | 7:03/700 | 8:90/700 | 8:43/700 |
| F/FD | 2:13/360 | 4:59/490 | 5:21/650 | 5:10/550 | 5:31/670 |
| F/FD | 4:47/590 | 4:44/570 | 5:24/630 | 4:47/610 | 5:07/570 |
| F/FD | 5:06/580 | 4:44/580 | 5:23/620 | 5:06/590 | 5:08/570 |
| HEC[i] 0.19 g | 7:45/510 | 7:34/550 | 8:09/570 | 7:53/570 | 7:45/580 |
| HEC 0.21 g | 16:33/490 | 15:18/480 | 13:32/510 | 15:04/540 | 13:14/480 |
| PAC[j] 0.21 g | 31:54/450 | 30:23/440 | 26:44/440 | 37:01/450 | 26:48/440 |
| HEC 0.20 g | 50:54/430 | 52:45/410 | 50:17/410 | 56:23/440 | 51:02/420 |
| IO[k] 10 mL | 50:44/430 | 83:30/370 | 48:36/410 | 97:24/410 | 17:40/460 |
| CaCl₂ 11.6 g | 0/0 | †/330 | ‡/330 | 0:00/0 | 0:00/0 |
| HEC 0.21 g | 0/0 | 6:14/340 | 3:26/350 | 0:00/0 | 0:00/200 |
| HEC 0.22 g PAC 0.20 g | 0/0 | 2:58/320 | 1:42/330 | 0:00/0 | 0:00/190 |
| HEC 0.22 g | 0/0 | 2:42/330 | 1:43/340 | 0:00/0 | 0:34/240 |
| F | 0/140 | 1:30/360 | 0:22/400 | 0:20/250 | 0:20/230 |
| F | 0/140 | 2:24/390 | 2:44/430 | 0:25/300 | 0:35/290 |
| F | 0/150 | 3:43/420 | 3:20/480 | 1:08/360 | 1:27/370 |
|  | 0/n/a | 5:09/500 | 3:24/610 | / | 12:19/500 |

[a]F104 - comparison foamer;
[b]DF104 - associated defoamer;
[c]F1 - Foamer #1;
[d]DF8 - first defoamer tailored for F1 and F2;
[e]DF9 - second defoamer tailored to F1 and F2;
[f]F2 - Foamer #2;
[g]FH - foam height;
[h]F/FD - foam-defoam cycle
[i]HEC - hydroxy ethyl cellulose;
[j]PAC - Drispac ® available from Drilling Specialties Company LLC.;
[k]IO - Isooctane The formula of DF8 si 70 wt. % Frac Sol, a diesel cut, 15 wt. % of 2-ethylhexanol, 15 wt. % of polypropylene glycol ethoxylates and 5 wt. % aliphatic alcohol ethoxylates. The formula of DF9 is 40 wt. % Frac mix, 15 wt. % of 2-ethylhexanol, 20 wt. % of isopropanol, 10 wt. % of methanol, and 30 wt. % alcohol ethoxylates. Ethoxylates are linear or straight chain alcohols of about 3 to about 24 carbon atoms, preferably about 6 to about 14 carbon atoms, with about 1.5 to about 5 moles of ethylene oxide added, preferably, linear ing materials, in the presence or absence of polypropylene glycol, having a molecular weight between about 1000 and about 3000 are well suited for use in defoamers. Moreover, these alcohol ethoxylates can include from about 10 to about 50 wt. % ethylene oxide, propylene oxide or mixtures thereof. The ethylene and/or propylene oxide can be added continuously or sequentially, or after ethylene oxide addition, the alcohol ethoxylated can be terminated with propylene oxide, butylene oxide, epichlorohydrin, or mixtures thereof.

TABLE XX

Foamer and Large Amount of Defoamer Combinations in Tap Water

| Cycle | F104[a]/DF104[b] F(g)/FD(g)[g]/ DF Time | F1[c]/DF8[d] F(g)/FD(g)[g]/ DF Time | F1/DF9[e] F(g)/FD(g)[g]/ DF Time | F2[f]/DF8 F(g)/FD(g)[g]/ DF Time | F2/DF9 F(g)/FD(g)[f]/ DF Time |
|---|---|---|---|---|---|
| F/FD[h] | 1.02/2.82/0:54 | 1.03/3.14/1:03 | 1.02/1.00/0:19 | 1.05/3.50/122 | 1.06/135/0:30 |
| F/FD | 1.04/0.48/0:08 | 1.06/1.12/0:15 | 1.07/1.24/0:25 | 1.07/2.00/040 | 1.01/184/0:30 |
| F/FD | 1.05/2.73/0:27 | 1.04/1.28/0:31 | 1.05/1.12/0:20 | 1.02/1.62/042 | 1.01/172/0:27 |
| F/FD | 1.03/4.85/0:18 | 1.05/0.71/0:08 | 1.05/0.72/0:12 | 1.04/1.40/033 | 1.02/056/0:09 |
| HEC[i] 0.19 g | 1.11/3.02/0:47 | 1.08/3.32/0:38 | 1.11/1.30/0:11 | 1.06/1.88/029 | 1.12/146/0:18 |
| HEC 0.21 g | 1.03/2.24/0:28 | 1.09/1.19/0:23 | 1.07/0.71/0:08 | 1.06/2.25/026 | 1.06/125/0:13 |
| PAC[j] 0.21 g | 1.06/0.97/0:11 | 1.08/0.53/0:11 | 1.11/0.44/0:05 | 1.06/1.52/021 | 1.03/079/0:10 |
| HEC 0.20 g | 1.03/0.47/0:26 | 1.03/1.00/0:12 | 1.05/0.57/0:50 | 1.05/2.01/024 | 1.03/092/0:08 |
| IO[k] 10 mL | 1.06/1.67/0:14 | 1.05/1.10/0:14 | 1.08/0.56/0:08 | 1.06/1.04/019 | 1.05/097/0:22 |
| CaCl₂ 11.6 g | 1.04/none/na | 1.06/none/na | 1.03/none/na | 1.05/none/na | 1.04/none/na |
| HEC 0.21 g | 3.26/none/na | 1.10/none/na | 1.05/none/na | 2.94/none/na | 3.21/none/na |
| HEC 0.22 g | 3.13/none/na | 1.14/none/na | 1.16/none/na | 2.76/none/na | 1.06/none/na |

TABLE XX-continued

Foamer and Large Amount of Defoamer Combinations in Tap Water

| Cycle | F104[a]/DF104[b] F(g)/FD(g)[g]/ DF Time | F1[c]/DF8[d] F(g)/FD(g)[g]/ DF Time | F1/DF9[e] F(g)/FD(g)[g]/ DF Time | F2[f]/DF8 F(g)/FD(g)[g]/ DF Time | F2/DF9 F(g)/FD(g)[f]/ DF Time |
|---|---|---|---|---|---|
| PAC 0.20 g HEC 0.22 g | 2.00/none/na | 2.02/none/na | 2.04/none/na | 2.15/none/na | 2.02/none/na |
| F | 2.00/none/na | 2.14/2.24/na | 2.16/none/na | 2.09/0.20/na | 2.06/none/na |
| F | 2.04/none/na | 2.11/3.43/na | 2.19/none/na | 2.06/0.25/na | 2.14/none/na |
| F | 5.04/none/na | 5.00/none/na | 5.01/none/na | 5.02/none/na | 5.13/none/na |

[a]F104 - comparison foamer;
[b]DF104 - associated defoamer;
[c]F1 - Foamer #1;
[d]DF8 - first defoamer tailored for F1 and F2;
[e]DF9 - second defoamer tailored to F1 and F2;
[f]F2 - Foamer #2;
[g]FH - foam height;
[h]F/FD - foam-defoam cycle
[i]HEC - hydroxy ethyl cellulose;
[j]PAC - Drispac ® available from Drilling Specialties Company LLC.;
[k]IO - Isooctane The data in Tables XIX and XX demonstrate that Foamer #1 and Foamer #2 having mostly better foam and break characteristics than the comparison systems F104, a non-zwitterionic-containing foamer.

EXAMPLE 11

This examples illustrates corrosion ring analysis data using Foamer #1 in a drilling operation.

TABLE XXI

Corrosion Ring Analysis Data

| Test Number | Depth In (ft) | Depth Out (ft) | Exposure Interval (ft) | Exposure (hr) | $wt_i$ (gms) | $wt_f$ (gms) | $wt_l$ (gms) | CR lb/ft$^3$/yr | mpy |
|---|---|---|---|---|---|---|---|---|---|
| 1[a] | 10,980 | 12,000 | 1,020 | 107 | 69.553 | 68.947 | 0.606 | 1.909 | 46.95 |
| 2[b] | 10,980 | 12,000 | 1,020 | 113 | 69.315 | 69.171 | 0.144 | 0.431 | 10.59 |

[a]Coupon No. 1040 located at Top of BHA;
[b]Coupon No. 1048 located at Kell Saver Sub

EXAMPLE 12

These examples illustrate the use of Foamer #1 in a underbalanced recycled foam drilling and clean out operation in wells in Texas and Canada. The data indicates that Foamer #1 is ideally suited for underbalanced recycled foam drilling and/or clean out providing adequate repeat foam behavior with little or no solid build up or other problems that are encountered with other foam systems. In fact, F104, a comparative foam system, is not suited for drilling and/or clean out operations as set forth in these examples.

TABLE XXII

Foamer #1 Tests in Underbalanced Drilling Operations - Well Data

| Property | Well #1[a] | Well #2[b] | Well #3[c] |
|---|---|---|---|
| Drillout Date | Aug. 23, 2003 | Dec. 09, 2003 | Dec. 12, 2003 |
| TD Date | Aug. 27, 2003 | Dec. 11, 2003 | Dec. 13, 2003 |
| Days on well | 4 | 4 | 3 |
| Drilling Days | 2 | 3 | 2 |
| Drilling Hours | 30.25 | 36 | 17 |
| Average ROP (ft/hr) | 33.88 | 3.60 | 8.89 |
| Distance Drilled (ft) | 1025 | 150 | 151 |
| True Vertical Depth (ft) | 12,000 | 1650 | 1360 |
| Average Half-life (min) | 21.08 | 8 | 3 |
| Bottom hole Temperature (° F.) | 57.2 | 80 | 80 |
| Average Bottom hole Pressure (psi) | NA | 3200 | 2800 |

[a]well in Hemphill County, Texas;
[b]first well in the Findley field;
[c]second well in the Findley field

TABLE XXIII

Casing Design of Well #1

| Casing Description | Top MD (ft) | End MD (ft) | Csg OD (in) | Csg ID (in) | Hole Size (in) |
|---|---|---|---|---|---|
| Surface | 0 | 2,888 | 9.625 | 8.75 | 12.25 |
| Intermediate | 0 | 10,975 | 7 | 6.151 | 8.75 |
| Open Hole | 10,975 | 12,000 | | | 6.125 |

TABLE XXIV

Casing Design of Well #2

| Casing Description | Top MD (m) | End MD (m) | Csg OD (mm) | Csg ID (mm) | Hole Size (mm) |
|---|---|---|---|---|---|
| Surface | 0 | 200 | 244.5 | 225.0 | 311 |
| Intermediate | 200 | 1520 | 140.0 | 128.1 | 200 |
| Open Hole | 1520 | 1670 | open | open | 121 |

TABLE XXV

Casing Design of Well #23

| Casing Description | Top MD (m) | End MD (m) | Csg OD (mm) | Csg ID (mm) | Hole Size (mm) |
|---|---|---|---|---|---|
| Surface | 0 | 160 | 200 | 244 | 311 |
| Intermediate | 160 | 1224 | 140 | 128 | 200 |
| Open Hole | 1234 | 1375 | Open | Hole | 121 |

TABLE XXVI

Interval Discussion

| Property | Well #1[a] | Well #2[b] | Well #3[c] |
|---|---|---|---|
| Hole Size | 6.125 in | 121 mm | 121 mm |
| Length of Interval | 1,025 ft | 151 m | 150 m |
| Drilling Fluid | Recyclable Foamer #1 system | Recyclable Foamer #1 System | Recyclable Foamer #1 System |
| Formations | Granite Wash | Dunvegan Sandstone | Dunvegan Sandstone |
| Bottom Hole Pressures | Not measured | With foam model simulations. Bottom Hole Pressures appeared to be stable and underbalanced throughout the entire interval. | With foam model simulations. Bottom Hole Pressures appeared to be stable throughout the underbalanced section of this well. |
| Foam Half Life | 21.08 min | 3-5[d] min | 8-12[d] min |

[a]well in Hemphill Country, Texas;
[b]well in the Findley field;
[c]well in the Findley field;
[d]min maintained with extra additions of HEC and PAC polymers.

Interval Discussion Summary Well #1

While waiting on cement cleaned rig pits and filled with fresh water. Tripped in hole and tagged cement at 10,900 ft, drilled out cement, float, and shoe with the fresh water from rig pits. This volume was saved and the pH lowered with sulfuric acid from 11.5 to 7.5 which in turn reduced the fluid volume to the reserve pit and lowered clean up costs. Tripped out to 5,143 ft, and blew down well. Tripped in to 6,941 ft and then to 9,014 ft staging well blow downs. During the well blow downs the FOAMER #1/CORROSION system was built in the surface pits. Began drilling and circulating to the flare pit. The flare pit contained approximately 400 bbls/$H_2O$ from blowing the well down. This extra volume diluted the recyclable system and had to be rebuilt. Drilling commenced while unloading the hole of solids till the system was rebuilt and the half life was above 30 minutes. Drilled ahead to 11,295 ft, short tripped into the casing, waited ½ hour and tripped back in. Cleaned out 8 ft of fill and began drilling again, pressures remained steady and hole conditions good. Drilled to 11,710 ft, trip for new bit, wash 30 ft to bottom, no fill, change rotating head rubber, change out float at 11,742 ft, drill to 12,000 ft TD, circulate 30 minutes and blow well dry, short trip to casing, 3 ft fill, trip out for logs, log, run and cement casing.

Interval Discussion Summary Well #2

Drilled out float and shoe with fresh water. The drill out water was used as make up water. The viscosity of the base fluid was raised to 32-33 sec/L with HEC and PAC (Liquid Polymers). By using the cement water, a pretreatment for Carbonate and Bicarbonate contamination was implemented. Stable circulating pressures were noticed throughout most part of the underbalanced (EB) drilling phase. There was no BHP sub on this job, foam models simulated stable circulating pressures. Initial $N_2$ and fluid rates started at 25 $m^3$/min and 80 L/min, respectively, but were later increased to $30^{M3}$/min and 100 L/min, respectively, to enhance hole cleaning and increase BHP due to good gas influx. These adjustments proved to be successful as good fluid and sample returns were established. The Premix tank brought to location helped considerably as solids were allowed to settle out by utilizing shimmers. TD was called at 1670 m, no problems were encountered.

Interval Discussion Summary Well #3

Drilled out float and shoe with fresh water. The drill out water was used as make up water. The viscosity of the base fluid was raised to 31-32 sec/L with HEC and PAC (Liquid Polymers). By using the cement water, a pretreatment for carbonate and bicarbonate contamination was implemented. Stable circulating pressures were noticed throughout the entire underbalanced section. No bottom hole pressure subs were run on the job, but foam model simulators indicated stable circulating pressures. A premix tank was utilized on this job and proved to provide adequate solids settlings and removal which is mandatory for this type of circulating system to function properly. The well was TD at 1375 m, no major problems were encountered. A slight problem with a low Half Life was noticed on this well due to reusing base fluid from previous well.

Interval Discussion Fluid Properties Well #1

DENSITY: Initially the density was 8.3 ppg. Due the lack of solids control equipment and high penetration rates the density increased to 8.7 ppg @ 12,000 ft. VISCOSITY: Initially the viscosity was 32 sec/qt. As penetration and solids content increased viscosity rose to 35-38 sec/qt. PLASTIC VISCOSITY: Initial PV was 4-5 centipoises and increased as solids increased to 12-15 centipoises. YIELD POINT: Initial YP was 2-5 lb/100 $R^3$. As viscosity was increased the YP increased to 8-10 lb/100 $ft^3$. GELS: Gels remained steady at 0-1 lb/100 $ft^3$ initial, 2-3 lb/100 $ft^3$ for 10 minute gels. FLUID LOSS: Initially no fluid control products were added and fluid loss was no control. With the increase of solids fluid loss was 7.5 cc/30 sec. pH: While drilling the cement with fresh water the pH rose to 12-14. Sulphamic acid was added to lower the Ph to 8-9. The pH was controlled between 8-9.5 with Alpha 3210 (pH modifier) and caustic soda. ALKALINITIES: (Pf) was controlled between 0.1-0.7. As some $CO_2$ gas was encountered the (Pf) dropped to 0 and (Mf) rose to 1.5. With the (Mf) being so high and TD so close no lime was added. CHLORIDES: Initial chlorides were 300 ppm. As depth increased a salt water zone was encountered and chlorides increased to 12,000 ppm. Fresh water was added for solids reduction and chlorides lowered to 7,000 ppm. CALCIUM: Calcium levels after drilling cement were 240 ppm. This level of calcium was maintained without chemical treatment. With the increase in $CO_2$ gas that was encountered in the wellbore the calcium level dropped to 60 ppm on its own along with the additions of Alpha 3210 and caustic soda. SAND: Sand remained low throughout this well even with the increased solids content because of the proper utilization of the settling pits. This indicates that the solids content was due to ultra-fines which are lower than 20 microns. TOTAL SOLIDS: Initially total solids were 0% but increased to 2.5% because of the lack of solids control equipment. OIL: Oil rose to 1.5% at 12,000 ft (TD). The oil was a light green color which indicates condensate and was in direct connection as the chlorides increased with the salt water flow the more the oil content rose. Heavy gases were also recorded by the gas testing unit. CARBONATES/BICARBONATES: The carbonate/bicarbonates remained low throughout this well and the bicarbonate increased only when $CO_2$ gas was encountered at 11,500-11,800 ft. Being TD was so close no lime was added to control the bicarbonate problem.

Interval Discussion Fluid Properties Well #2

The initial Viscosity of the base fluid was 32sec/1 and was maintained at this level throughout the EB drilling phase. The Density started at 1000 kg/$M^3$ and increased slightly to 1005 kg/$M^3$ due to a slight increase in drilled solids. After drill out cement contamination raised the Ph to 12, additions of Bicarb were used to lower pH to 9-9.5. All other base fluid properties were within normal operating parameters.

Interval Discussion Fluid Properties Well #3

The Viscosity of the base fluid started at 31 sec/L and was maintained at this level throughout the underbalanced drilling phase. The Density started at 1005 kg/$M^3$ and increased to 1015 kg/$M^3$ this was due not only to the increase in drilled solids but also the fact that the base fluid was recycled over from a previous well. After drill out cement contamination raised the pH to 13+ but was lowered down to 9-9.5 with Bicarb. All other base fluid properties were within normal operating parameters.

Interval Discussion Flow Analysis Well #1

The most important flow parameter garnered from this well was the ability to clean the vertical section to 12,000 ft with drilling rates between 50-150 ft/hr. No problems were encountered drilling to 12,000 ft (TD).

Interval Discussion Flow Analysis Well #2

Initially the fluid rates were set at 80 L/min and the $N_2$ rates were set 25 $m^3$/min. These rates were adjusted to 100 L/min and 30 $m^3$/min to enhance hole cleaning and increase BHP due to good gas influx. These rate adjustments were maintained to TD.

Interval Discussion Flow Analysis Well #3

The fluid rates were initially set at 80 L/min and the $N_2$ rate was 25 $m^3$/min. These rates were changed as drilling ahead continued to 100 L/min and 30 $m^3$/min and were maintained to T.D. Hole cleaning was never an issue on this well due to the good gas influx which was encountered.

TABLE XXVII

| Drilling Parameters | | | | | | | | |
|---|---|---|---|---|---|---|---|---|
| Depth (ft) | $BHPc^a$ (psi) | $IP^b$ (psi) | $GR^c$ (cf/min) | $LR^d$ (gal/min) | $HL^e$ (min) | $FH^f$ (mL) | $FIR^g$ (gal/hr) | $DFIR^h$ (gal/hr) |
| Well #1[i] | | | | | | | | |
| 9,014 | | | | | 24 | 340 | | |
| 11,095 | 846 | 610 | 1,400 | 35 | 7.5 | 400 | 5 | 6 |
| 11,250 | 846 | 750 | 1,400 | 36 | 38 | 330 | 7 | 8 |
| 11,340 | 846 | 725 | 1,400 | 35 | 32 | 320 | 6 | 6 |
| 11,630 | 800 | 620 | 1,700 | 23 | 10 | 320 | 7 | 5 |
| 11,680 | 800 | 630 | 1,700 | 23 | 15 | 360 | 7 | 5 |
| 11,760 | 860 | 600 | 1,600 | 25 | 25 | 380 | 7 | 5 |
| 11,860 | | | | | 21 | 360 | | |
| Well #2[j] | | | | | | | | |
| 1552 | 3200 | 10500 | 25 | 80 | 12 | 460 | 10 | 15 |
| 1605 | 3500 | 10500 | 30 | 100 | 6 | 530 | 10 | 15 |
| 1655 | N/a | N/a | 30 | 100 | 8 | 560 | 10 | 15 |
| Well #3[k] | | | | | | | | |
| 1235 | 3200 | 10700 | 25 | 80 | 5 | 350 | 8 | 16 |
| 1260 | 1153 | 2783 | 25 | 100 | 4 | 420 | 6 | 16 |
| 1300 | 1200 | 2784 | 30 | 100 | 3 | 400 | 6 | 16 |
| 1350 | 1155 | 2800 | 25 | 150 | 3 | 370 | 6 | 16 |
| 1375 | 1145 | 2656 | 25 | 150 | 3 | 350 | 6 | 16 |

[a]Bottom Hole Pressure Calculated;
[b]Injection Pressure;
[c]Gas Rate;
[d]Liquid Rate;
[e]Liquid Rate;
[f]Foam Height;
[g]Foam Injection Rate;
[h]De-Foam Injection Rate;
[i]well in Hemphill County, Texas;
[j]well in the Findley field;
[k]well in the Findley field

TABLE XXVIII

Foamer #1 Recycle System Product Consumption

| Product | Description | Quantity Used |
|---|---|---|
| *Well #1[a]* | | |
| Foamer #1 | Foamer/Surfactant | 32 pals[†] |
| KB | Defoamer | 23 pals[†] |
| HEC | Polymer Viscosifier | 38 pals[†] |
| PAC | Polymer Viscosifier | 21 pals[†] |
| PF 38 | Shale Inhibition | 128 pals[†] |
| SI 501 | Scale Inhibitor | 4 drums[‡] |
| Dionic 900 | Shale Inhibitor | 4 drums[‡] |
| Sulphamic Acid | pH Reducer | 10 drums[‡] |
| Alpha 3210 | pH Control | 4 drums[‡] |
| Corr Foam 1 | Scale Inhibitor | 5 drums[‡] |
| Caustic Soda | pH Control | 4 sacks* |
| EDTA | Iron Control | 2 drums[‡] |
| *Well #2[b]* | | |
| Foamer #1 | Foamer/Surfactant | 12 × 20 L |
| WFT-DF-104 | Defoamer | 23 × 20 L |
| HEC | Polymer Viscosifier | 3 × 18.93 L |
| PAC | Polymer Viscosifier | 2 × 18.93 L |
| Caustic Soda | pH Control | 1 × 22.7 Kg |
| Lime | Alkalinity Control | 1 × 25 Kg |
| Bicarb | Alkalinity Control | 1 × 25 Kg |
| *Well #3[c]* | | |
| Foamer #1 | Foamer/Surfactant | 3 × 20 L |
| WFT-DF-104 | Defoamer | 20 × 20 L |
| HEC | Polymer Viscosifier | 6 × 18.93 L |
| PAC | Polymer Viscosifier | 3 × 18.93 L |
| BICARB OF SODA | pH Control | 6 × 25 Kg |

[a]well in Hemphill County, Texas;
[b]first well in the Findley field;
[c]second well in the Findley field The foaming composition of this invention including a zwitterionic compound and an anionic surfactant are well suited for drilling and clean out applications, for drilling and clean out applications using traditional coiled tubing, and for drilling and clean out applications and other downhole application using capillary coiled tubing.

KB is defoaming including 40 wt. % of an environmentally friendly hydrocarbon, 20 wt. % of isopropanol, 10 wt. % of methanol, 15 wt. % of 2-ethylhexanol, and 15 wt. % of aliphatic alcohol ethoxylates as described above.

EXAMPLE 13

These examples illustrate the use of Foamer #2 recycle foam tests. The data is tabulated in Table XXIX.

TABLE XXIX

Foamer #1 Data Evidencing Increase Productivity of Low Productivity Wells

| Additives/Comments | Amount (gms) | FH | ¼ L | ½ L | DF (gms) | DF FH | Total Time |
|---|---|---|---|---|---|---|---|
| Foamer #2/Red 1 Defoamer | | | | | | | |
| | 0.64 | 600+ | 7:23 | 11:11 | 1.26 | | 18 |
| small amount splashed out | 0.81 | 600+ | 3:31 | 6:29 | 1.75 | | |
| | 0.60 | 410 | 3:39 | 6:05 | 0.70 | | |
| 10 mL iso-Octane | 063 | 150 | <1:00 | | na | | |
| 5.1 Liquid HEC 8 g/L | 0.62 | 350 | 4:13 | 7:23 | na | | |
| | 0.73 | 470 | 5:12 | 8:23 | 1.66 | | |
| | 0.79 | 440 | 5:18 | 8:30 | | | |
| Foamer #2/Red 2 Defoamer | | | | | | | |
| | 0.64 | 600+ | 7:43 | 11:46 | 2.28 | 140 | 18 |
| | 0.61 | 500 | 3:28 | 5:43 | 0.93 | | |
| | 0.91 | 490 | 4:00 | 5:54 | 0.93 | | |
| 10 mL iso-Octane | 0.66 | 250 | 1:21 | 2:22 | na | | |
| 4.91 Liquid HEC 8 g/L | 0.66 | 320 | 2:20 | 3:49 | na | | |
| 2.60 Liquid HEC 8 g/L | 0.62 | 400 | 4:16 | 6:50 | na | | |
| | 0.69 | 520 | 6:01 | 8:54 | 2.03 | | |
| | 0.63 | 500 | 6:16 | 9:35 | | | |
| Foamer #2 (50/50/10)/Red 3 Defoamer | | | | | | | |
| fast break | 0.89 | 600+ | 7:47 | 11:45 | 1.99 | 40 | 18 |
| | 0.74 | 325 | 2:20 | 4:10 | na | | |
| | 0.70 | 520 | 3:07 | 5:47 | 0.55 | | |
| 10 mL iso-Octane | 0.57 | 350 | 2:27 | 3:28 | na | | |
| 5.10 Liquid HEC 8 g/L | 0.57 | 400 | 3:36 | 5:50 | na | | |
| 1.95 Liquid HEC 8 g/L | 0.51 | 520 | 6:01 | 9:03 | 2.00 | | |
| | 0.77 | 550 | 5:40 | 8:30 | 2.19 | | |
| | 0.72 | 490 | 5:03 | 7:56 | | | |
| Foamer #2/Red 4 Defoamer | | | | | | | |
| | 0.61 | 600+ | 737 | 1137 | 3.22 | 150 | 18 |
| | 0.69 | 600 | 334 | 612 | 1.01 | | |
| slow break | 0.88 | 600+ | 409 | 474 | 2.03 | | |
| 10 mL iso-Octane | 0.72 | 550 | 458 | 473 | na | | |
| | 0.95 | 600+ | 618 | 918 | 2.67 | | |

TABLE XXIX-continued

Foamer #1 Data Evidencing Increase Productivity of Low Productivity Wells

| Additives/Comments | Amount (gms) | FH | ¼ L | ½ L | DF (gms) | DF FH | Total Time |
|---|---|---|---|---|---|---|---|
| no HEC needed | 0.62 | 600+ | 618 | 944 | | | |
| Foamer #2/Green 1 Defoamer | | | | | | | |
| | 0.63 | 600+ | 745 | 1128 | 3.31 | | 18 |
| | 0.65 | 300 | 109 | 219 | na | | |
| | 0.76 | 500 | 330 | 556 | 0.52 | | |
| 10 mL iso-Octane | 0.76 | 230 | 051 | 141 | na | | |
| 5.12 Liquid HEC 8 g/L | 0.60 | 325 | 153 | 317 | na | | |
| 1.91 Liquid HEC 8 g/L | 0.56 | 440 | 405 | 622 | 0.94 | | |
| | 0.73 | 510 | 509 | 818 | 1.38 | | |
| | 0.62 | 510 | 522 | 818 | | | |
| Foamer #2/Green 3 Defoamer | | | | | | | |
| | 0.77 | 600+ | 738 | 1102 | 4.6 | | 18 |
| | 0.60 | 150 | 037 | 103 | na | | |
| | 0.64 | 300 | 212 | 342 | 0.19 | | |
| | 0.71 | 400 | 338 | 554 | 0.19 | | |
| 10 mL iso-Octane | 0.62 | 450 | 501 | 741 | na | | |
| | 0.70 | 520 | 531 | 806 | 0.91 | | |
| | 0.72 | 530 | 537 | 803 | | | |
| Foamer #2/Red 5 Defoamer | | | | | | | |
| small amount splashed out | 0.66 | 600 | 7:22 | 11:17 | 3.08 | | |
| 10 mL iso-Octane | 0.87 | 130 | no | | | | |
| 5.10 Liquid HEC 8 g/L | 0.68 | 450 | 5:14 | 8:20 | 1.47 | | |
| | 0.75 | 600 | 6:10 | 9:28 | 5.79 | | |
| | 0.60 | 550 | 7:15 | 10:13 | 2.30 | | |
| 6.67 g CaCl$_2$ | 0.65 | no foam | | | | | |
| 5.60 Liq HEC 8 g/L | 1.05 | no foam | | | | | |
| Foamer #2/Red 6 Defoamer | | | | | | | |
| | 0.57 | 600+ | 7:34 | 11:20 | 3.64 | | |
| 10 mL iso-Octane | 0.98 | 250 | 1:04 | 2:02 | na | | |
| 4.82 Liquid HEC 8 g/L | 0.60 | 600+ | 5:07 | 8:03 | 1.95 | | |
| | 1.08 | 600+ | 5:27 | 8:33 | 4.50 | | |
| | 0.92 | 600+ | 6:42 | 9:56 | 1.27 | | |
| 7.20 g CaCl$_2$ | 0.63 | no foam | | | | | |
| 5.40 Liq HEC 8 g/L | 0.98 | no foam | | | | | |
| Foamer #2 (50/50/10)/Red 7 Defoamer | | | | | | | |
| | 0.65 | 600+ | 7:18 | 10:58 | 2.85 | 50 | |
| 10 mL iso-Octane | 0.96 | 500 | 5:00 | 7:40 | 0.66 | | |
| | 1.02 | 500 | 5:02 | 7:47 | 1.05 | | |
| | 0.71 | 520 | 5:08 | 7:51 | 1.20 | | |
| 6.16 g CaCl$_2$ | 0.73 | no foam | | | | | |
| 5.97 Liq HEC 8 g/L | 1.10 | 130 | | | | | |
| 0.93 g PAC | 0.59 | 10 | | | | | |
| 7.69 Liq HEC 8 g/L | 0.99 | 300 | 1:07 | 2:30 | | | |
| 6.00 Liq HEC 8 g/L | 1.00 | 400 | 3:01 | 5:36 | | | |
| Foamer #2/Red 8 Defoamer | | | | | | | |
| fast defoamer | 0.65 | 600+ | 7:33 | 11:31 | 1.63 | 0 | |
| 10 mL iso-Octane | 1.00 | 490 | 5:02 | 8:05 | 0.45 | | |
| | 0.84 | 550 | 4:59 | 7:20 | 0.97 | | |
| | 0.78 | 550 | 4:56 | 7:29 | 0.86 | | |
| 6.68 g CaCl$_2$ | 0.98 | 160 | 0:39 | 1:20 | | | |
| 5.40 Liq HEC 8 g/L | 0.98 | 180 | 1:05 | 1:50 | | | |
| 0.77 g PAC | 0.74 | 260 | | 1:44 | | | |
| 8.00 Liq HEC 8 g/L | 1.13 | 360 | 1:38 | | | | |
| 5.00 Liq HEC 8 g/L | 1.00 | 450 | 4:06 | 6:00 | | | |
| Foamer #2/Red 9 Defoamer | | | | | | | |
| | 0.71 | 600+ | 7:52 | 12:02 | 5.94 | 50 | |
| 10 mL iso-Octane | 0.81 | 450 | 4:26 | 7:22 | 0.48 | | |
| | 1.04 | 650+ | 5:05 | 7:50 | 2.10 | | |
| | 0.65 | 600+ | 5:35 | 8:42 | 2.05 | | |
| 6.68 g CaCl$_2$ | 0.70 | 40 | | | | | |
| 5.40 Liq HEC 8 g/L | 1.01 | 170 | | <0:25 | | | |
| Foamer #2/Red 10 Defoamer | | | | | | | |
| | 0.57 | 600+ | 7:45 | 11:45 | 3.05 | 20 | 25 |
| 10 mL iso-Octane | 0.90 | 480 | 4:16 | 6:34 | 0.31 | | |
| | 0.69 | 600+ | 5:37 | 8:44 | 1.74 | | |

TABLE XXIX-continued

Foamer #1 Data Evidencing Increase Productivity of Low Productivity Wells

| Additives/Comments | Amount (gms) | FH | ¼ L | ½ L | DF (gms) | DF FH | Total Time |
|---|---|---|---|---|---|---|---|
| 6.14 g CaCl$_2$ | 0.65 | 600+ | 5:54 | 8:56 | 1.60 | | |
| 5.05 Liq HEC 8 g/L | 0.58 | no foam | | | | | |
| | 0.78 | | | | | | |

EXAMPLE 14

These examples illustrate the use of Foamer #1 in enhancing the production of low productivity wells. The data is tabulated in Table XXX.

TABLE XXX

Foamer #1 Data Evidencing Increase Productivity of Low Productivity Wells

| Date | MCF | BBLS/H2O | BBLS/COND | GALS/DAY |
|---|---|---|---|---|
| Chesapeake Well (Oklahoma) Foamer #1 1:1 Deionized Water | | | | |
| Nov. 01, 2003 | 1300 | 40 | 12 | 8 |
| Nov. 02, 2003 | 1900 | 65 | 19.5 | 8 |
| Nov. 03, 2003 | 2100 | 65 | 19.5 | 8 |
| Nov. 07, 2003 | 2000 | 70 | 21 | 8 |
| Nov. 17, 2003 | 2100 | 65 | 19.5 | 8 |
| Dec. 05, 2003 | 2100 | 65 | 19.5 | 6 |
| Dec. 13, 2003 | 2000 | 65 | 19.5 | 6 |
| Crown - Thomas Peek Well (Oklahoma) Foamer #1 2:1 Deionized Water | | | | |
| Oct. 02, 2003 | 95 | 50 | | 8 |
| Oct. 03, 2003 | 136 | 55 | | 10 |
| Oct. 04, 2003 | 180 | 50 | | 10 |
| Oct. 06, 2003 | 200 | 55 | | 12 |
| Oct. 17, 2003 | 220 | 55 | | 8 |
| Oct. 22, 2003 | 100 | 20 | | 0 |
| Nov. 28, 2003 | 90 | 30 | | 0 |
| Dec. 05, 2003 | 220 | 60 | | 5 |
| Dec. 17, 2003 | 220 | 60 | | 5 | the data shown in Table XXX demonstrates that the foaming compositions of this invention are ideally suited for increasing the productivity of low to moderate productivity wells, showing an increase in MCF of about 120% (220 MCF) over the well in the absence of Foamer #1 (100 MCF).

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. An aqueous foaming composition for use in oil field applications comprising from about 8 to about 16 wt. % of a first anionic alcohol ether sulfate surfactant comprising short chain sodium or ammonium alcohol ether sulfate surfactants having between 2 and about 10 carbon atoms, from about 40 to about 60 wt. % of a second anionic alcohol ether sulfate surfactant comprising long chain sodium or ammonium alcohol ether sulfate surfactants having between about 10 to about 24 carbon atoms, and from about 15 wt. % to about 35 wt. % of at least one zwitterionic compounds, where the composition is biodegradable, is heat stable at a temperature of 280° F., has a near zero Zeta value, produces no residuals at temperatures up to 280° F. and is capable of being recycled.

2. The composition of claim 1, wherein alcohol ether sulfate surfactants comprise compounds of the general formula $R^1O-(CH_2CH_2O)_nSO_3NH_4$, where $R^1$ is a carbon-containing group including an alkyl group, an aryl group, an alkaryl group, an aralkyl group or mixture thereof.

3. The composition of claim 1, further comprising at least two short chain sodium or ammonium alcohol ether sulfate surfactants, and at least two long chain sodium or ammonium alcohol ether sulfate surfactants.

4. The composition of claim 1, wherein short chain sodium or ammonium alcohol ether sulfate surfactants have between about 4 and 10 carbon atoms.

5. The composition of claim 1, wherein the long chain sodium or ammonium alcohol ether sulfate surfactants have between about 12 and about 18 carbon atoms.

6. The composition of claim 1, wherein the long chain sodium or ammonium alcohol ether sulfate surfactants have between about 12 and about 14 carbon atoms.

7. The composition of claim 2, wherein the alkylaryl sulfonates selected from the group consisting of alkylbenzene sulfonic acids and their salts, dialkylbenzene disulfonic acids and their salts, dialkylbenzene sulfonic acids and their salts, alkyltoluene/alkyl xylene sulfonic acids and their salts, alkylnaphthalene sulfonic acids/condensed alkyl naphthalene sulfonic acids and their salts, alkylphenol sulfonic acids/condensed alkylphenol sulfonic acids and their salts, and mixtures or combinations thereof.

8. The composition of claim 2, wherein the alkyl ether sulfonates comprises compounds of the general formula $R^2[-(O-(R^3O)m-(R^4O)n-(R^5)]_y$, where: $R^2$=alkyl, alkenyl, amine, alkylamine, dialkylamine, trialkylamine, aromatic, polyaromatic, cycloalkane, cycloalkene, $R^3$, $R^4=C_2H_4$ or $C_3H_6$ or $C_4H_8$ $R^4$=linear or branched $C_7H_{14}SO_3X$ to $C_{30}H_{60}SO_3X$ when y =1, $R^5$=linear or branched $C_7H_{14}SO_3X$ to $C_{30}H_{60}SO_3X$ or H when y >1 but at least one $R^4$ must be linear or branched $C_7H_{14}SO_3X$ to $C_{30}H_{60}SO_3X$, M is greater or equal to 1, n is greater or equal to 0, n+m=1 to30+, y is greater or equal to 1, X=alkali metal or alkaline earth metal or ammonium or amine.

9. The composition of claim 1, further comprising at least one cationic surfactants comprising bis quaternary ammonium halides.

10. The composition of claim 1, wherein the zwitterionic compounds are selected from the group consisting of betaines, sulfo-betaines, amino acids, phospholipids, and mixtures or combinations thereof.

11. The composition of claim 10, wherein the betaines are selected from compounds of:
   (1) the general structure $R^6,R^7,R^8N^+-R^9-CO_2^-$, where $R^6$, $R^7$, and $R^8$ are the same or different carbon-containing group, amido carbon-containing group, ether carbon-containing group, or mixtures thereof, and $R^9$ is an alkenyl group, alkenyloxide group or mixtures thereof;

(2) the general structure $R^{10}(R^7,R^8N^+\!\!-\!\!R^9\!\!-\!\!CO_2^-)_n$, where $R^7$ and W are the same or different carbon-containing group, amido carbon-containing group, ether carbon-containing group, or mixtures thereof, $R^9$ is an alkenyl group, alkenyloxide group or mixtures thereof, and $R^{10}$ is a multivalent substituent having a valency n between 2 and about 6;

(3) the general structure $R^{12}\!\!-\!\!C(O)\!\!-\!\!N(R^{11})\!\!-\!\!R^{13}\!\!-\!\!N^+(R^7,R^8)\!\!-\!\!R^9\!\!-\!\!CO_2^-$, where $R^7$, $R^8$, $R^{11}$ and $R^{12}$ are the same or different carbon-containing group, amido carbon-containing group, ether carbon-containing group, or mixtures thereof, and $R^9$ and $R^{13}$ are the same or different alkenyl group, alkenyloxide group or mixtures thereof;

(4) the general structure $R^{14}\!\!-\!\![R^{15}\!\!-\!\!C(O)\!\!-\!\!N(R^{11})\!\!-\!\!R^{13}\!\!-\!\!N^+(R^7,R^8)\!\!-\!\!R^9\!\!-\!\!CO_2]_m$, where $R^7$, $R^8$ and $R^{11}$ are the same or different carbon-containing group, amido carbon-containing group, ether carbon-containing group, or mixtures thereof, $R^9$, $R^{13}$ and $R^{15}$ are the same or different alkenyl group, alkenyloxide group or mixtures thereof and $R^{14}$ is a multivalent substituent having a valency m between 2 and about 6; and (5) mixtures or combinations thereof.

12. The composition of claim 10, wherein the betaines are selected from group consisting of cocamidopropyl betaine, 5-(1-piperidiniomethyl)-1H-tetrazolide, and mixtures or combinations thereof.

13. The composition of claim 10, wherein the sulfo-betaines are selected from group consisting of N-decyl-N,N-dimethyl-3-ammonio-1-propanesulfonate; dimethylbenzyl-(3-sulfopropyl)ammonium; dimethylethyl-(3-sulfopropyl)ammonium; dimethyl-(2-hydroxyethyl)-(3-sulfopropyl)ammonium; 4-n-hexylbenzoylamido-propyl-dimethylammoniosulfobetaine; N-methyl-N-(3-sulfopropyl)morpholinium; 4-n-octylbenzoylamido-propyl-dimethylammoniosulfobetaine; 1-(3-sulfopropyl)pyridium; N-tetradecyl-N,N-dimethyl-3-ammonio-1-propane-sulfonate, and mixtures or combination thereof.

14. The composition of claim 10, wherein the phospholipids are selected from the group consisting of phosphatidylcholine, phosphatidylserine, phosphalidylethanolamine, sphingomyelin and other ceramides, and mixtures or combinations thereof.

15. The composition of claim 1, further comprising an additive selected from the group consisting of a winterizing agent, a foam booster, a anti-freeze agents, a solvent, a sodium salt of alpha olefin sulfonate (AOS), an acid salt, a nonionic surfactant, a fatty acid, a foam enhancer and mixtures or combinations thereof.

16. The composition of claim 15, wherein the winterizing agent is selected from the group consisting of lithium formate, sodium formate, potassium formate, cesium formate, triethyanolamine formate, and mixtures or combinations.

17. The composition of claim 15, wherein the foam booster comprises a cellosolve of the general formula $R^9OCH_2CH_2OH$ where $R^9$ is an alkyl group having between about 2 and about 8 carbon atoms and mixtures or combinations.

18. The composition of claim 15, wherein the anti-freeze agents selected from the group consisting of alcohols, glycols or other freezing point depressing agents and mixtures or combinations.

19. The composition of claim 15, wherein the solvent selected from the group consisting of water, alcohols, ethers, esters or mixtures or combinations thereof.

20. The composition of claim 15, wherein the sodium salt of alpha olefin sulfonate (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof.

21. The composition of claim 15, wherein the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof.

22. The composition of claim 15, wherein the nonionic surfactant is selected from the group consisting of polyalkylene oxide, amine oxides such as lauramine oxide and mixtures or combinations.

23. The composition of claim 15, wherein the fatty acid is selected from the group consisting of lauric acid, oleic acid, stearic acid and mixtures or combinations.

24. The composition of claim 15, wherein the foam enhancer selected from the group consisting of a linear dodecyl benzene sulfonic acid salt, a sarcosinate salt, and mixtures or combinations thereof.

25. An aqueous foaming composition comprising from about 8 to about 16 wt. % of a first alcohol ether sulfate surfactant comprising short chain sodium or ammonium alcohol ether sulfate surfactants having between 2 and about 10 carbon atoms, from about 40 to about 60 wt. % of a second alcohol ether sulfate surfactant comprising long chain sodium or ammonium alcohol ether sulfate surfactants having between about 10 to about 24 carbon atoms, at least one cationic surfactant and from about 15 wt. % to about 35 wt. % at least one zwitterionic compounds where the composition is biodegradable, is heat stable at a temperature of 280° F., and produces no residuals at temperatures up to 280° F. and capable of being recycled.

26. An aqueous foaming composition for use in oil field applications comprising from about 8 to about 16 wt. % of a first alcohol ether sulfate surfactant comprising short chain sodium or ammonium alcohol ether sulfate surfactants having between 2 and about 10 carbon atoms, from about 40 to about 60 wt. % of a second alcohol ether sulfate surfactant comprising long chain sodium or ammonium alcohol ether sulfate surfactants having between about 10 to about 24 carbon atoms, at least two cationic surfactants and from about 15 wt. % to about 35 wt. % at least one zwitterionic compounds where the composition is biodegradable, is heat stable at a temperature of 280° F., has a near zero Zeta value, and produces no residuals at temperatures up to 280° F. and capable of being recycled.

27. An aqueous foaming composition for use in oil field applications comprising a mixture or combination of from about 8 to about 16 wt. % of a first alcohol ether sulfate surfactant comprising short chain sodium or ammonium alcohol ether sulfate surfactants having between 2 and about 10 carbon atoms, from about 40 to about 60 wt. % of a second alcohol ether sulfate surfactant comprising long chain sodium or ammonium alcohol ether sulfate surfactants having between about 10 to about 24 carbon atoms, and at least one cationic surfactants and from about 15 wt. % to about 35 wt. % at least one zwitterionic compounds where the composition is biodegradable, is heat stable at a temperature of 280° F., has a near zero Zeta value, and produces no residuals at temperatures up to 280° F., produces a foam having a foam height of at least 580 mL and a foam half life of at least 5 minutes in tap water and the composition is capable of being recycled.

28. A foaming composition for use in oil field applications comprising from about 15 wt. % to about 35 wt. % of a betaine containing solution, from about 8 to about 16 wt % of a first anionic surfactant comprising a first alcohol ether sulfate surfactant solution comprising short chain sodium or ammonium alcohol ether sulfate surfactants having between 2 and about 10 carbon atoms and from about 40 to about 60 wt % of a second anionic surfactant comprising a second alcohol ether sulfate surfactant solution comprising long chain sodium or ammonium alcohol ether sulfate surfactants having between about 10 to about 24 carbon atoms with the balance being water, where the composition is biodegradable, is heat stable at a temperature of 280° F., has a near zero Zeta value, produces no residuals at temperatures up to 280° F., produces a foam having a foam height of at least 580 mL and a foam half life of at least 5 minutes in tap water and the composition is capable of being recycled.

29. The composition of claim 28, wherein the composition further comprises from about 20 to about 30 wt % of the betaine containing solution, from about 10 to about 14 wt % of the first alcohol ether sulfate surfactant solution and from about 45 to about 55wt % of the second alcohol ether sulfate surfactant solution with the balance being water.

30. The composition of claim 28, wherein the composition further comprises from about 25 wt % of a betaine containing solution, from about 12 wt % of a first alcohol ether sulfate surfactant solution and from about 50 wt % of a second alcohol ether sulfate surfactant solution with the balance being water.

31. The composition of claim 28, wherein the composition further comprises from about 40 wt. % to about 80 wt. % of a zwitterionic-containing foam composition comprising from about 25 wt% of a betaine containing solution, from about 12 wt % of a first alcohol ether sulfate surfactant solution and from about 50 wt % of a second alcohol ether sulfate surfactant solution with the balance being water, from about 60 to about 20 wt. % of an AOS and from about 1 wt. % to about 15 wt. % methanol.

32. The composition of claim 31, wherein the composition further comprises from about 45 wt. % to about 70 wt. % of the zwitterionic-containing foam composition, from about 55 wt. % to about 30 wt. % of the AOS, and from about 5 wt. % to about 10 wt. % methanol.

33. The composition of claim 32, wherein the composition further comprises from about 50 wt. % to about 60 wt. % of the zwitterionic-containing foam composition, from about 50 wt. % to about 40 wt. % of the AOS, and from about 5 wt. % to about 10 wt. % methanol.

34. The composition of claim 33, wherein the composition further comprises from about 55 wt. % of the zwitterionic-containing foam composition, about 45 wt. % of the AOS, and about 10 wt. % methanol.

35. The composition of claim 28, wherein the composition is diluted with a purified water selected from the group consisting of deionized water, osmotically purified water and mixtures or combinations thereof.

\* \* \* \* \*